US009835916B2

(12) United States Patent
Kim et al.

(10) Patent No.: US 9,835,916 B2
(45) Date of Patent: Dec. 5, 2017

(54) LIQUID CRYSTAL DISPLAY DEVICE HAVING INCREASED RESPONSE SPEED AND METHOD FOR MANUFACTURING LIQUID CRYSTAL DISPLAY DEVICE

(71) Applicant: Samsung Display Co., Ltd., Yongin (KR)

(72) Inventors: Young Min Kim, Yongin-si (KR); Jae Byung Park, Seoul (KR); Gak Seok Lee, Hwaseong-si (KR); Seung-Hwan Cho, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 571 days.

(21) Appl. No.: 14/336,454

(22) Filed: Jul. 21, 2014

(65) Prior Publication Data
US 2015/0198837 A1    Jul. 16, 2015

(30) Foreign Application Priority Data

Jan. 15, 2014   (KR) .................. 10-2014-0005309

(51) Int. Cl.
*G02F 1/1343*    (2006.01)
*G02F 1/1362*    (2006.01)
*G02F 1/1337*    (2006.01)

(52) U.S. Cl.
CPC .... *G02F 1/13624* (2013.01); *G02F 1/133707* (2013.01); *G02F 1/133711* (2013.01);
(Continued)

(58) Field of Classification Search
CPC ......... G02F 1/133707; G02F 1/133753; G02F 2001/133761; G02F 1/134309;
(Continued)

(56) References Cited

U.S. PATENT DOCUMENTS

2011/0242468 A1*  10/2011  Choi .................. C08G 8/12
                                                         349/129
2013/0029446 A1*   1/2013  Kim ................... H01L 27/124
                                                         438/34
(Continued)

FOREIGN PATENT DOCUMENTS

KR    10-2009-0057689    6/2009
KR    10-2010-0075756    7/2010
(Continued)

OTHER PUBLICATIONS

T. Akane et al., "KrF Excimer Laser Induced Ohmic Metallization of ZnO Substrate," Proceedings of SPIE, Laser Applications in Microelectronic and Optoelectronic Manufacturing, vol. 3933, pp. 218-224, Jun. 7, 2000.

(Continued)

*Primary Examiner* — Paisley L Arendt
(74) *Attorney, Agent, or Firm* — H.C. Park & Associates, PLC

(57) ABSTRACT

An exemplary embodiment of the present invention provides a liquid crystal display, including: a first substrate including a first pixel electrode, the first pixel electrode having a planar shape; a second substrate disposed facing the first substrate, including a common electrode disposed on the second substrate; a liquid crystal layer including a plurality of liquid crystal molecules disposed between the first substrate and the second substrate; and a plurality of pixels disposed between the first substrate and the second substrate, each of the plurality of pixels including a plurality of domains, and liquid crystal molecules of the liquid crystal layer disposed in different domains have different pretilt directions.

8 Claims, 18 Drawing Sheets

(52) U.S. Cl.
CPC ............... *G02F 1/133788* (2013.01); *G02F 2001/133742* (2013.01); *G02F 2001/133761* (2013.01); *G02F 2001/134345* (2013.01)

(58) Field of Classification Search
CPC ..... G02F 2001/134345; G02F 1/13439; G02F 1/13624; G02F 2001/13629; H01L 2251/308
See application file for complete search history.

(56) References Cited

U.S. PATENT DOCUMENTS

2013/0057813 A1    3/2013  Jeong et al.
2013/0271707 A1*  10/2013  Sakamoto ............... G02F 1/139
    349/106

FOREIGN PATENT DOCUMENTS

| KR | 10-2011-0076372 | 7/2011 |
|----|-----------------|--------|
| KR | 10-2012-0100565 | 9/2012 |

OTHER PUBLICATIONS

Byung Du Ahn et al., "Effect of Excimer Laser Annealing on the Performance of Amorphous Indium Gallium Zinc Oxide Thin-Film Transistors," Electrochemical and Solid-State Letters, vol. 12, Is.12, pp. H430-H432, The Electrochemical Society, Sep. 25, 2009.

* cited by examiner

LIQUID CRYSTAL DISPLAY DEVICE HAVING INCREASED RESPONSE SPEED AND METHOD FOR MANUFACTURING LIQUID CRYSTAL DISPLAY DEVICE

CROSS-REFERENCE TO RELATED APPLICATION

This application claims priority from and the benefit of Korean Patent Application No. 10-2014-0005309 filed on Jan. 15, 2014, which is hereby incorporated by reference for all purposes as if fully set forth herein.

BACKGROUND

Field

Exemplary embodiments of the present invention relate to a liquid crystal display and a manufacturing method thereof, and more particularly, to a liquid crystal display and a manufacturing method thereof having improved viewing angle, response speed, and transmittance.

Discussion of the Background

A liquid crystal display is one of flat panel display devices that are being widely used. A liquid crystal display generally includes two substrate panels wherein an electric field is generated by using electrodes such as a pixel electrode and a common electrode, and a liquid crystal layer interposed therebetween.

The liquid crystal display generates an electric field in a liquid crystal layer by applying a voltage to the field generating electrodes to align orientations of liquid crystal molecules of the liquid crystal layer and control polarization of incident light, thereby displaying an image.

The liquid crystal display also includes a switching device connected to each pixel electrode and a plurality of signal lines, such as gate lines, data lines, and the like, for controlling the switching device to apply a voltage to the pixel electrode.

Among the liquid crystal displays, a vertically aligned mode liquid crystal display, in which a long axis of a liquid crystal molecule is arranged to be perpendicular to a display panel when electric field is not applied, has a high contrast ratio and a wide reference viewing angle. The reference viewing angle refers to a viewing angle having a contrast ratio of 1:10 or an inter-gray scale luminance reversal limit angle.

To increase the response speed of the liquid crystal display, various methods have been proposed to provide the liquid crystal molecules with initial alignment. Among the initial alignment methods, a method for providing a pretilt to liquid crystal molecules uses prepolymers that may be polymerized by light such as ultraviolet rays. In this case, to secure a wide viewing angle, a tilt direction of liquid crystal molecules is decentralized by using, e.g., a method of forming a micro-slit in an electric field generating electrode.

As such, when a pixel electrode has a plurality of branch electrodes by forming micro-slits, transmittance of the liquid crystal display may be reduced.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a liquid crystal display having improved transmittance thereof while having a wide viewing angle and a quick response speed.

Additional features of the invention will be set forth in the description which follows, and in part will be apparent from the description, or may be learned by practice of the invention.

An exemplary embodiment of the present invention provides a liquid crystal display, including: a first substrate including a first pixel electrode, the first pixel electrode having a planar shape; a second substrate disposed facing the first substrate, including a common electrode disposed on the second substrate; a liquid crystal layer including a plurality of liquid crystal molecules disposed between the first substrate and the second substrate; and a plurality of pixels disposed between the first substrate and the second substrate, each of the plurality of pixels including a plurality of domains, and liquid crystal molecules of the liquid crystal layer disposed in different domains have different pretilt directions.

An exemplary embodiment of the present invention provides a manufacturing method of a liquid crystal display, including: forming a first pixel electrode including an oxide semiconductor material on a first substrate; forming a second pixel electrode including a plurality of branch electrodes on the first pixel electrode; forming a common electrode on the second substrate; assembling the first substrate and the second substrate to face each other; disposing a liquid crystal layer between the first substrate and the second substrate, the liquid crystal layer including liquid crystal molecules and prepolymers; pretilting the liquid crystal molecules, including: applying a voltage to the second pixel electrode and the common electrode; and polymerizing the prepolymers by radiating ultraviolet rays to the liquid crystal layer to align the liquid crystal molecules in pretilt angles.

An exemplary embodiment of the present invention also provides a manufacturing method of a liquid crystal display, including: forming a first pixel electrode including an oxide semiconductor material in a pixel on a first substrate; making a first region of the first pixel electrode to have a conductive characteristic; forming a common electrode on a second substrate; assembling the first substrate and the second substrate to face each other; disposing a liquid crystal layer between the first substrate and the second substrate, the liquid crystal layer including liquid crystal molecules and prepolymers; pretilting the liquid crystal molecules, including: applying a voltage to the second pixel electrode and the common electrode; and polymerizing the prepolymers by radiating ultraviolet rays to the liquid crystal layer to align the liquid crystal molecules in pretilt angles; and making an entire part of the first pixel electrode to have a conductive characteristic.

In accordance with the exemplary embodiments of the present invention, in an operation of generating a pretilt of the liquid crystal molecules, it is possible to improve a response speed of liquid crystals and to widen a viewing angle thereof by forming the pixel electrode to have a shape with a plurality of branch electrodes.

Further, in an operation of actually driving the liquid crystal display, it is possible to improve transmittance thereof by forming the pixel electrode to have a planar shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
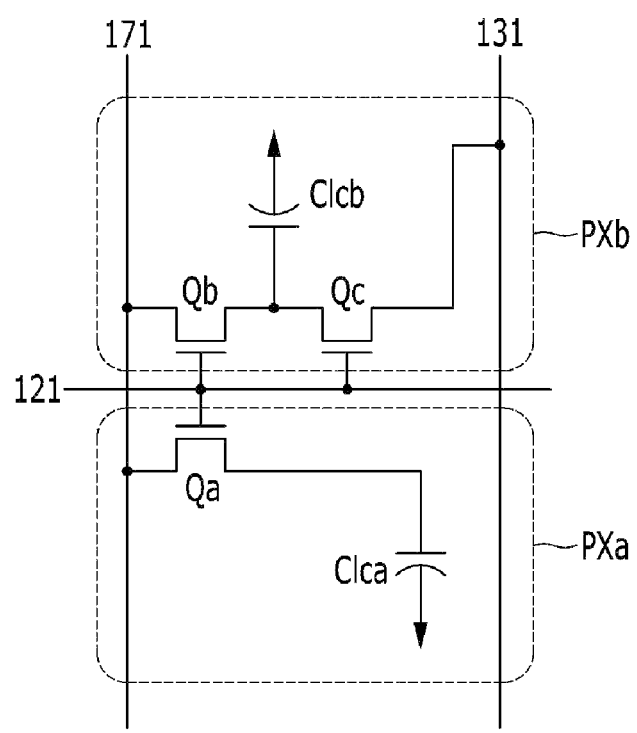
FIG. 1 is an equivalent circuit diagram illustrating a single pixel of a liquid crystal display in accordance with exemplary embodiments of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Therefore, these embodiments are provided so that this disclosure is thorough, and will fully convey the scope of the invention to those skilled in the art.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

First, a liquid crystal display in accordance with an exemplary embodiment of the present invention will be described with reference to FIG. 1 and FIG. 2.

Figure 2:
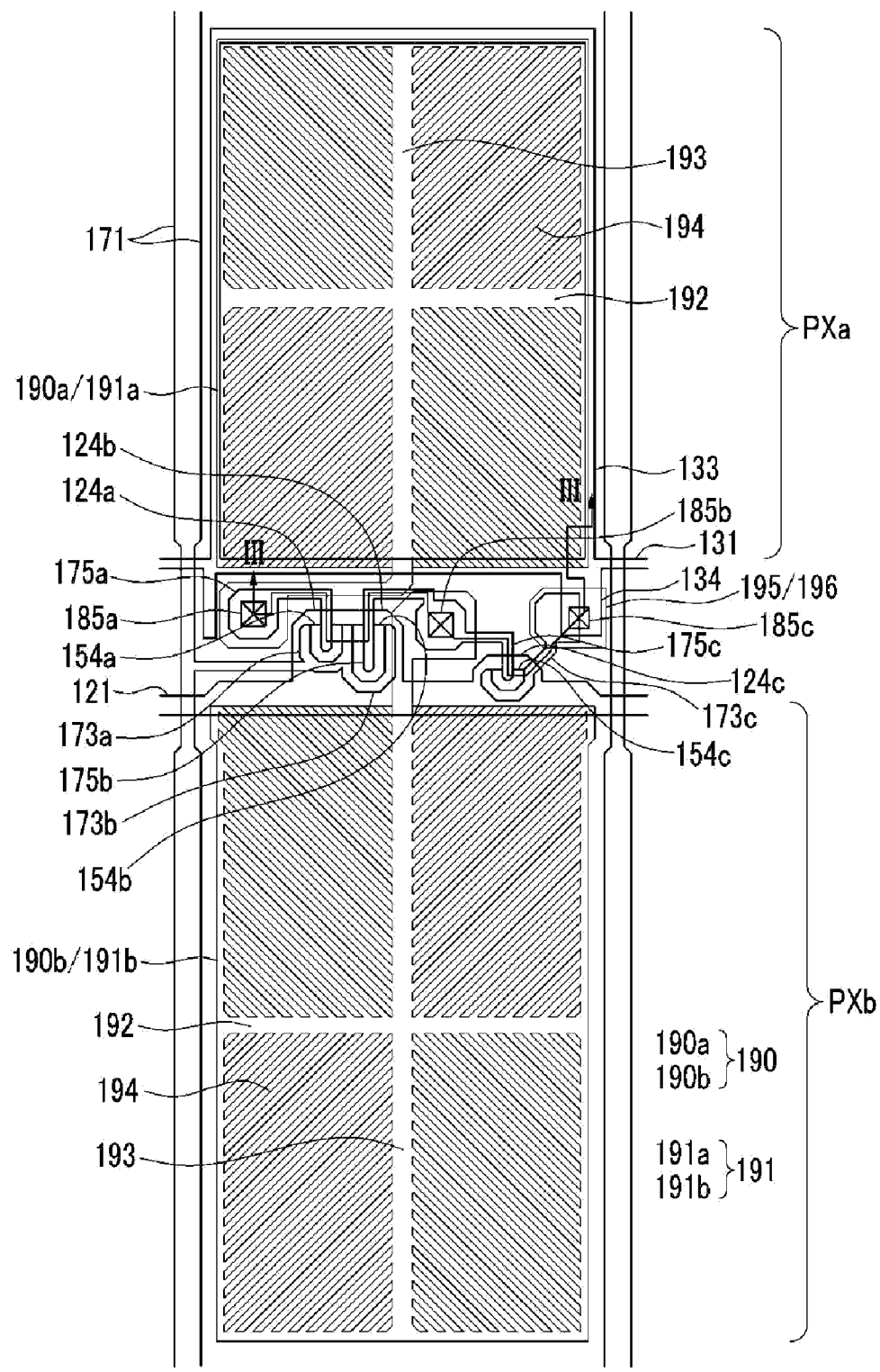
FIG. 2 is a top plan view showing the liquid crystal display in accordance with exemplary embodiments of the present invention.

FIG. 1 is an equivalent circuit diagram illustrating a single pixel of a liquid crystal display in accordance with exemplary embodiments of the present invention, and FIG. 2 is a top plan view showing the liquid crystal display in accordance with exemplary embodiments of the present invention.

Referring to FIGS. 1 and 2, the liquid crystal display includes a first switching element Qa and a second switching element Qb connected to the same gate line 121 and the same data line 171. The liquid crystal display further includes a third switching element Qc connected to the gate line 121, the second switching element Qb, and a reference voltage line 131. The first to third switching elements Qa, Qb, and Qc may be formed of a thin film transistor and the like.

Each pixel PX includes two subpixels PXa and PXb. A first liquid crystal capacitor Clca connected to the first switching element Qa is formed or disposed at the first subpixel PXa, and a second liquid crystal capacitor Clcb connected to the second switching element Qb is formed or disposed at the second subpixel PXb The first switching element Qa includes a gate terminal connected to the gate line 121, a source terminal connected to the data line 171, and a drain terminal connected to the first liquid crystal capacitor Clca. Particularly, the drain terminal of the first switching element Qa is connected to a third subpixel electrode 191a included in the first liquid crystal capacitor Clca.

The second switching element Qb includes a gate terminal connected to the gate line 121, a source terminal connected to the data line 171, and a drain terminal connected to the second liquid crystal capacitor Clcb. Particularly, the drain terminal of the second switching element Qb is connected to a fourth subpixel electrode 191b.

The third switching element Qc includes a gate terminal connected to the gate line 121, a source terminal connected to the reference voltage line 131, and a drain terminal connected to the drain terminal of the second switching element Qb An operation of the liquid crystal display according to the exemplary embodiment of the present invention will now be described. When a gate-on voltage is applied to the gate line 121, the gate-on voltage is applied to a first gate electrode 124a, a second gate electrode 124b, and a third gate electrode 124c to turn on all of the first to third switching elements Qa, Qb, and Qc. Accordingly, a data voltage transferred through the data line 171 is applied to a third subpixel electrode 191a and the fourth subpixel electrode 191b respectively through the first switching element Qa and the second switching element Qb. Accordingly, the first liquid crystal capacitor Clca and the second liquid crystal capacitor Clcb are charged.

In this case, since the third switching element Qc is turned on, the data voltage transmitted from the data line 171 to the second subpixel PXb is divided among the third switching element Qc and the second switching element Qb that are connected in series. At this time, the voltage is distributed according to sizes of channels of the second switching element Qb and the third switching element Qc Accordingly, even though the data line 171 transmits the same data voltages to the first subpixel PXa and the second subpixel PXb, different voltages are charged in the first liquid crystal capacitor Clca and the second liquid crystal capacitor Clcb. That is, the voltage charged in the second liquid crystal capacitor Clcb is lower than the voltage charged in the first liquid crystal capacitor Clca. Accordingly, side visibility can be improved based on different voltages charged in the first and second subpixels PXa and PXb within the same pixel PX.

Hereinafter, the liquid crystal display in accordance with the present exemplary embodiment will be further described with reference to FIGS. 1, 2, 3, 4, and 5.

Figure 3:
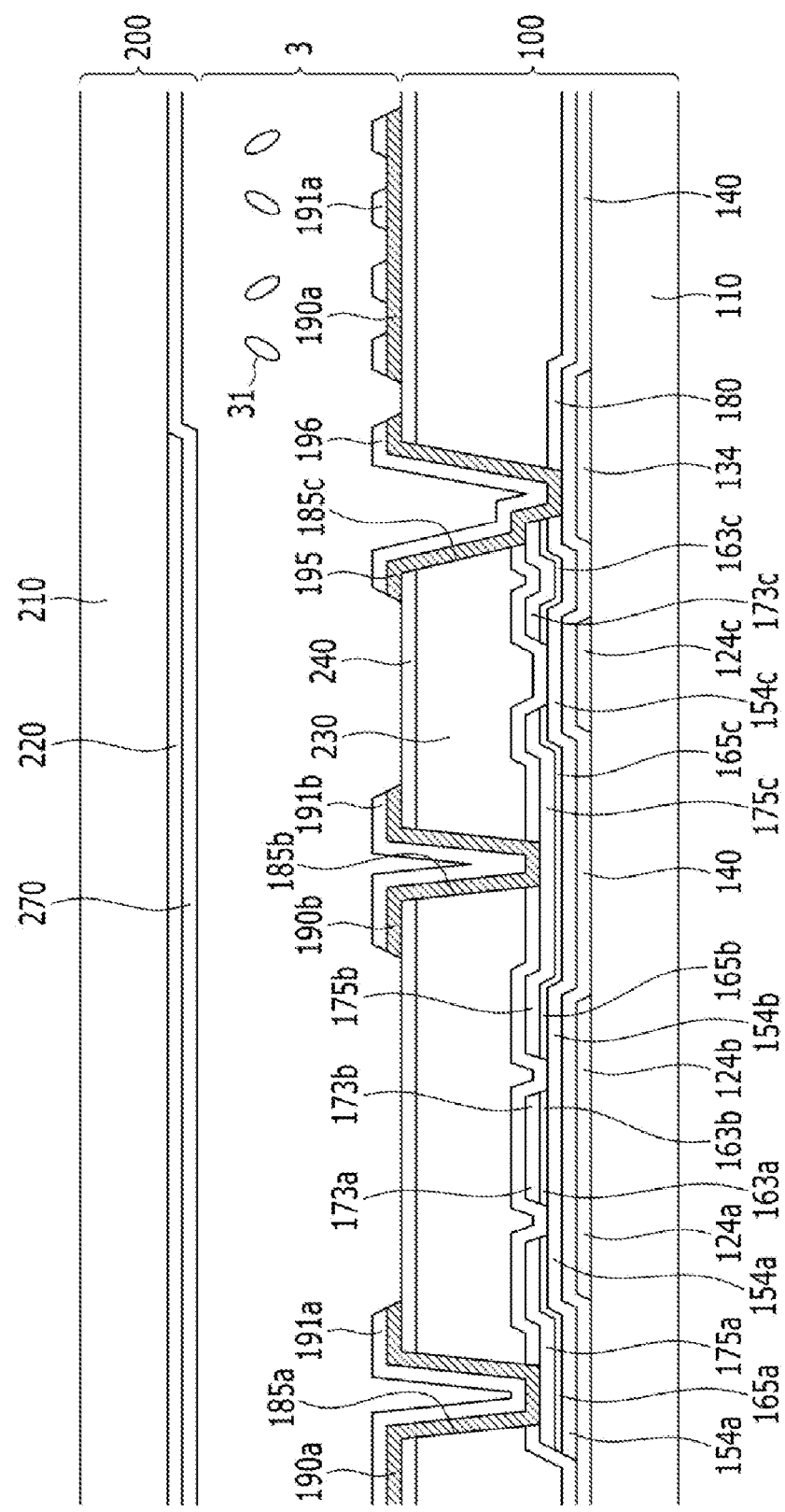
FIG. 3 is a cross-sectional view taken along with a line III-III of FIG. 2 in accordance with exemplary embodiments of the present invention.
Figure 4:
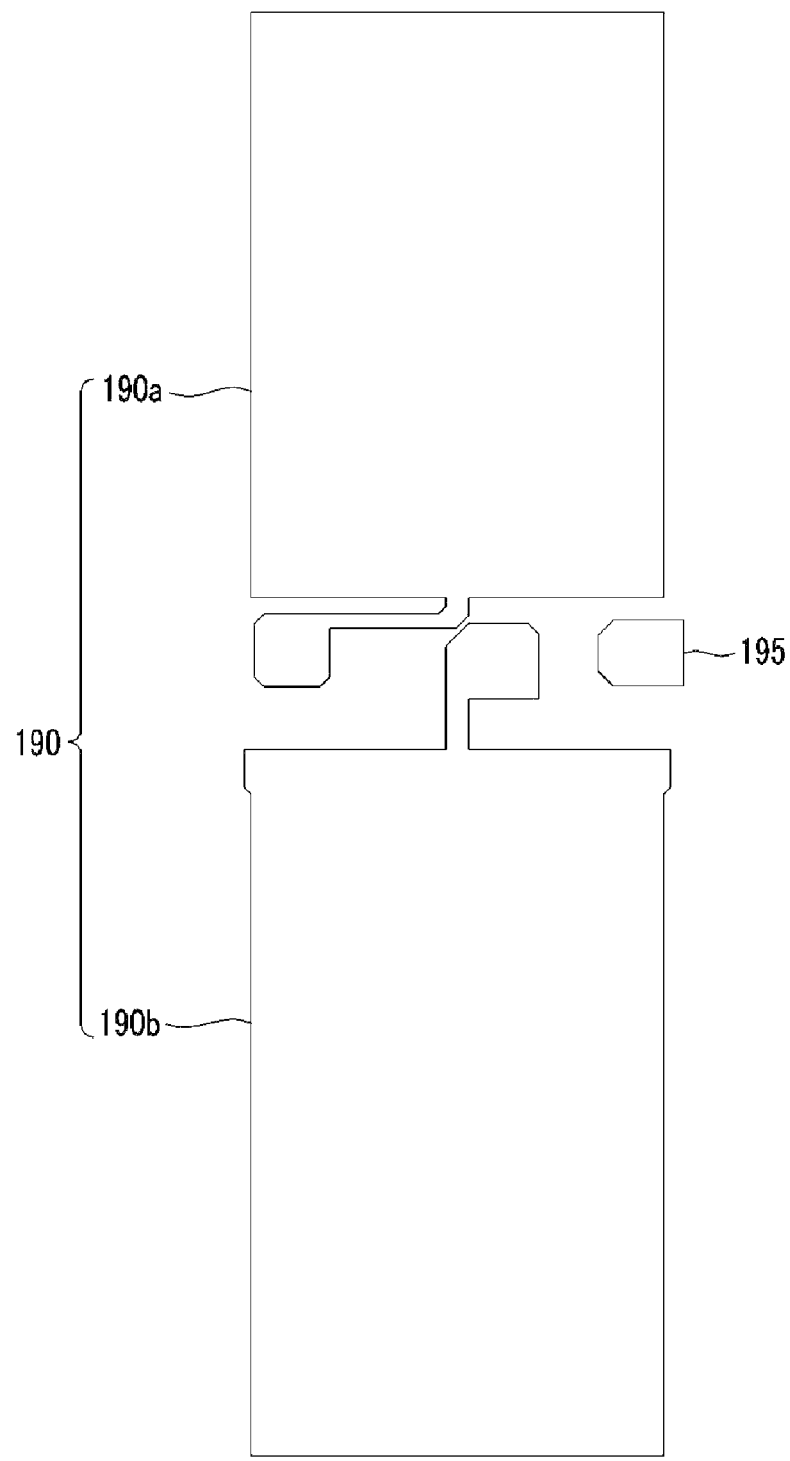
FIG. 4 and FIG. 5 are top plan views showing layers of the liquid crystal display in accordance with exemplary embodiments of the present invention.
Figure 5:
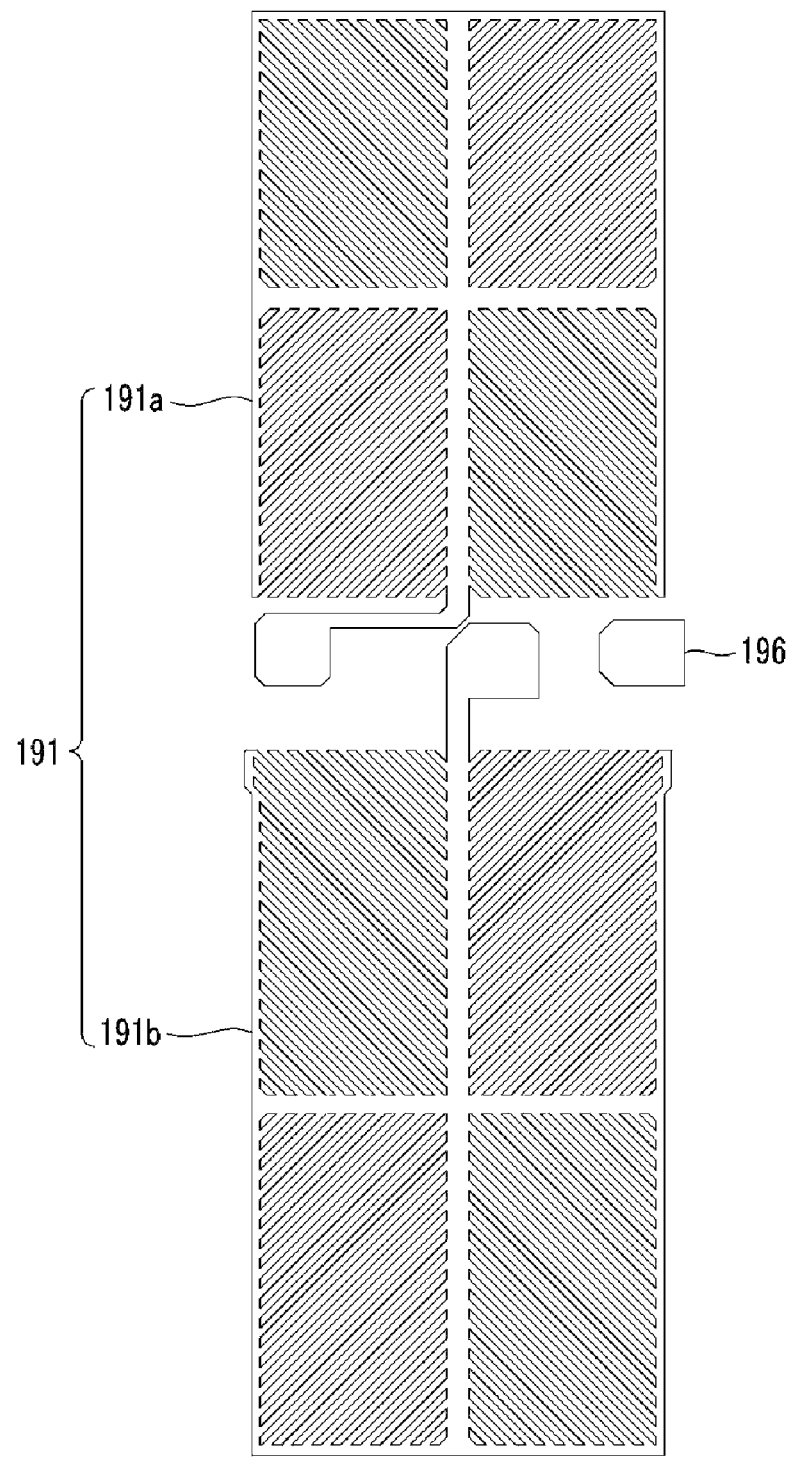

FIG. 3 is a cross-sectional view taken along with a line III-III of FIG. 2 in accordance with exemplary embodiments of the present invention, and FIG. 4 and FIG. 5 are top plan views showing layers of the liquid crystal display in accordance with exemplary embodiments of the present invention.

The liquid crystal display in accordance with the exemplary embodiment of the present invention includes a lower panel 100 and an upper panel 200 facing each other, and a liquid crystal layer 3 injected or disposed between the lower and upper panels 100 and 200.

First, the lower panel 100 will be described.

The gate line 121 and the reference voltage line 131 are formed on a first substrate 110 in one direction. The first substrate 110 may be made of transparent glass or plastic, but is not limited to thereof.

The gate line 121 mainly extends in a horizontal direction to transmit a gate signal. A first gate electrode 124a, a second gate electrode 124b, and a third gate electrode 124c are formed or disposed on the first substrate 110, connected to the gate line 121. The first to third gate electrodes 124a, 124b, and 124c may be formed to protrude from the gate line 121. The first gate electrode 124a and the second gate electrode 124b may be integrally formed as a single unit. The first to third gate electrodes 124a, 124b, and 124c are connected to the same gate line 121 and are configured to receive the same gate signal.

The reference voltage line 131 may extend in the direction substantially parallel with that of the gate line 121 and receive a reference voltage. A storage electrode 133 and a protrusion 134 are formed or disposed to protrude from the reference voltage line 131. The storage electrode 133 may be formed or disposed to surround a first subpixel electrode 190a which will be described later, and the protrusion 134 may be formed or disposed to protrude toward the gate line 121.

A gate insulating layer 140 is formed or disposed on the gate line 121, the first to third gate electrodes 124a, 124b, and 124c, and the reference voltage line 131. The gate insulating layer 140 may be made of an inorganic insulating material such as a silicon nitride (SiNx) or a silicon oxide (SiOx). The gate insulating layer 140 may be formed or disposed as a single layer or a multilayer.

A first semiconductor layer 154a, a second semiconductor layer 154b, and a third semiconductor layer 154c are formed or disposed on the gate insulating layer 140. More specifically, the first semiconductor layer 154a may be disposed on the first gate electrode 124a, the second semiconductor layer 154b may be disposed on the second gate electrode 124b, and the third semiconductor layer 154c may be disposed on the third gate electrode 124c. The first to third semiconductor layers 154a, 154b, and 154c may be formed or disposed below the data line 171.

A plurality of ohmic contacts 163a, 163b, 163c, 165a, 165b, and 165c are formed or disposed on the first to third semiconductor layers 154a, 154b, and 154c. In the case that the first to third semiconductor layers 154a, 154b, and 154c are formed or disposed of an oxide semiconductor, the ohmic contacts may be omitted.

The data line 171, a first source electrode 173a, a first drain electrode 175a, a second source electrode 173b, a second drain electrode 175b, a third source electrode 173c, and a third drain electrode 175c are formed or disposed on the ohmic contacts 163a, 163b, 163c, 165a, 165b, and 165c and the gate insulating layer 140.

The data line 171 is configured to transmit the data voltage and extends mainly in a vertical direction crossing the gate line 121.

The first source electrode 173a is formed or disposed to protrude from the data line 171, disposed on the first gate electrode 124a. The first source electrode 173a may have a bent C shape in plan view.

The first drain electrode 175a is formed or disposed on the first gate electrode 124a, spaced apart from the first source electrode 173a. A first channel may be formed or disposed on a corresponding portion of the first semiconductor layer 154a exposed between the first source electrode 173a and the first drain electrode 175a.

The second source electrode 173b may be connected to the first source electrode 173a and be disposed on the second gate electrode 124b. The second source electrode 173b may be formed or disposed to have a bent C shape in plan view.

The second drain electrode 175b is formed or disposed on the second gate electrode 124b, spaced apart from the second source electrode 173b. A second channel may be formed or disposed on a corresponding portion of the second semiconductor layer 154b exposed between the second source electrode 173b and the second drain electrode 175b.

The third source electrode 173c is formed or disposed on the third gate electrode 124c and the protrusion 134. The third source electrode 173c overlaps at least a portion of the protrusion 134. The third source electrode 173c may be formed or disposed on the third gate electrode 124c to have a bent C shape.

The third drain electrode 175c is formed or disposed on the third gate electrode 124c, spaced apart from the third source electrode 173c. A third channel may be formed or disposed on a corresponding portion of the third semiconductor layer 154c exposed between the third source electrode 173c and the third drain electrode 175c. The third drain electrode 175c is connected to the second drain electrode 175b.

The first gate electrode 124a, first semiconductor layer 154a, first source electrode 173a, and first drain electrode 175a constitute a first switching element Qa. Further, the second gate electrode 124b, the second semiconductor layer 154b, the second source electrode 173b, and the second drain electrode 175b constitute a second switching element Qb, and the third gate electrode 124c, the third semiconductor layer 154c, the third source electrode 173c, and the third drain electrode 175c constitute a third switching element Qc.

A passivation layer 180 is formed or disposed on the data line 171, the first to third source electrodes 173a, 173b, and 173c, and the first to third drain electrodes 175a, 175b, and 175c. A portion of the passivation layer 180 is configured to expose first to third semiconductor layers 154a, 154b, and 154c. The passivation layer 180 may be made of an inorganic insulating material such as a silicon nitride (SiNx) or a silicon oxide (SiOx).

A color filter 230 is disposed on the passivation layer 180. The color filter 230 may express one of primary colors including red, green, and blue. The colors expressed by the color filter 230 are not limited thereto, and the color filter 230 may express one of cyan, magenta, yellow, and white-based colors.

A light blocking member may be disposed on an area where the color filter 230 is not located and a part of the color filter 230. The light blocking member is also called a black matrix and prevents light leakage.

A capping layer 240 is formed or disposed on the color filter 230. The capping layer 240 serves to prevent the color filter 230 from lifting and suppresses contamination of the liquid crystal layer 3 by an organic material, such as a solvent flowing from the color filter, so as to prevent defects such as an afterimage from being generated when a screen is driven.

In the passivation layer 180, the color filter 230, and the capping layer 240, a first contact hole 185*a*, a second contact hole 185*b*, and a third contact hole 185*c* are respectively formed or disposed so as to expose portions of the first drain electrode 175*a*, the second drain electrode 175*b*, and the third drain electrode 175*c*.

A first pixel electrode 190 is formed or disposed on the capping layer 240. The first pixel electrode 190 includes the first subpixel electrode 190*a* and the second subpixel electrode 190*b*. The first subpixel electrode 190*a* and the second subpixel electrode 190*b* are electrically separated from each other. The first subpixel electrode 190*a* is formed or disposed in the first subpixel PXa, and the second subpixel electrode 190*b* is formed or disposed in the second subpixel PXb.

The first pixel electrode 190 includes an oxide semiconductor material, which is made of a metal oxide and has a semiconductor characteristic. For example, the first pixel electrode 190 is formed of indium gallium zinc oxide (IGZO). The first pixel electrode 190 may be formed by disposing a material having a semiconductor characteristic and making it conductive by laser irradiation or the like. Thus, the first pixel electrode 190 in accordance with the present exemplary embodiment may have a conductive characteristic instead of the semiconductor characteristic.

The first subpixel electrode 190*a* is electrically connected to the first drain electrode 175*a* through the first contact hole 185*a*, and the second subpixel electrode 190*b* is electrically connected to the second drain electrode 175*b* through the second contact hole 185*b*.

The first subpixel electrode 190*a* and the second subpixel electrode 190*b* respectively receive data voltages from the first drain electrode 175*a* and the second drain electrode 175*b*. In this case, some of the data voltage applied to the second drain electrode 175*b* is divided to the third drain electrode 175*c*, and thus the absolute value of the voltage applied to the second subpixel electrode 190*b* is smaller than that of the voltage applied to the first subpixel electrode 190*a*. When the data voltage applied to the first subpixel electrode 190*a* and the second subpixel electrode 190*b* is positive, the voltage applied to the first subpixel electrode 190*a* is higher than the voltage applied to the second subpixel electrode 190*b*. In contrast, when the data voltage applied to the first subpixel electrode 190*a* and the second subpixel electrode 190*b* is negative, the voltage applied to the data voltage applied to the first subpixel electrode 190*a* is lower than the voltage applied to the second subpixel electrode 190*b*.

Each of the first subpixel electrode 190*a* and the second subpixel electrode 190*b* is formed or disposed to have a planar shape. Each of the first subpixel electrode 190*a* and the second subpixel electrode 190*b* is formed or disposed to have a substantially quadrangular shape.

The second subpixel electrode 190*b* may have an area equal to or more than the area of the first subpixel electrode 190*a* and equal to or less than twice the area of the first subpixel electrode 190*a*.

A first bridge electrode 195 is further formed or disposed on the capping layer 240.

The first bridge electrode 195 is electrically connected to the protrusion 134 and the third source electrode 173*c* through the third contact hole 185*c*. That is, the third source electrode 173*c* is electrically connected to the reference voltage line 131.

The first pixel electrode 190 and the first bridge electrode 195 may be formed or disposed at the same layer by using the same material. FIG. 4 illustrates the first pixel electrode 190 and the first bridge electrode 195.

Referring to FIG. 5, a second pixel electrode 191 is formed or disposed on the first pixel electrode 190. The second pixel electrode 191 is formed or disposed immediately on the first pixel electrode 190. The second pixel electrode 191 includes the third subpixel electrode 191*a* and the fourth subpixel electrode 191*b*. The third subpixel electrode 191*a* and the fourth subpixel electrode 191*b* are electrically separated from each other. The third subpixel electrode 191*a* is formed or disposed on the first subpixel electrode 190*a* in the first subpixel PXa. The fourth subpixel electrode 191*b* is formed or disposed on the second subpixel electrode 190*b* in the second subpixel PXb.

Each of the third subpixel electrode 191*a* and the fourth subpixel electrode 191*b* includes a conductive material. For example, each of the third subpixel electrode 191*a* and the fourth subpixel electrode 191*b* may be made of indium tin oxide (ITO) or an indium zinc oxide (IZO).

Since the third subpixel electrode 191*a* is formed or disposed immediately on the first subpixel electrode 190*a*, the voltage applied to the first subpixel electrode 190*a* is also transferred to the third subpixel electrode 191*a*. That is, the third subpixel electrode 191*a* receives the data voltage from the first drain electrode 175*a*.

Since the fourth subpixel electrode 191*b* is formed or disposed immediately on the second subpixel electrode, the voltage applied to the second subpixel electrode 190*b* is also transferred to the fourth subpixel electrode 191*b*. That is, the fourth subpixel electrode 191*b* receives the data voltage from the second drain electrode 175*b*.

As described above, some of the data voltage applied to the second drain electrode 175*b* is divided through the third drain electrode 175*c*. Accordingly, the voltage applied to the fourth subpixel electrode 191*b* is smaller than the voltage applied to the third subpixel electrode 191*a*.

Referring back to FIG. 2, each of the third subpixel electrode 191*a* and the fourth subpixel electrode 191*b* is formed or disposed to have an overall quadrangular planar shape. Each of the third subpixel electrode 191*a* and the fourth subpixel electrode 191*b* includes a horizontal stem 192 and a vertical stem 193 crossing the horizontal stem 193. Each of the third subpixel electrode 191*a* and the fourth subpixel electrode 191*b* is divided into four domains by the horizontal stem 192 and the vertical stem 193, and includes branch electrodes 194 disposed at each domain.

The branch electrodes 194 of the third subpixel electrode 191*a* and the fourth subpixel electrode 191*b* obliquely extend from either the horizontal stem 192 or the vertical stem 193 in an upper left direction, an upper right direction, a lower left direction, and a lower right direction.

Each of the branch electrodes 194 forms an angle of substantially 40 to 50 degrees with the gate line 121 and the horizontal stem 192. Further, the branch electrodes 194 of two adjacent domains may be perpendicular to each other, but not limited thereto.

A second bridge electrode 196 is further formed or disposed on the first bridge electrode 195. Herein, the second bridge electrode 196 is formed or disposed immediately on the first bridge electrode 195.

The second pixel electrode 191 and the second bridge electrode 196 may be formed or disposed at the same layer by using the same material. FIG. 5 illustrates the second pixel electrode 191 and the second bridge electrode 196 which are formed or disposed at the same layer.

Next, the upper panel 200 will be described. A light blocking member 220 and a common electrode 270 are formed or disposed on a second substrate 210 made of transparent glass or plastic.

The light blocking member 220 is formed or disposed overlapping the gate line 121, the data line 171, and the first to third switching elements Qa, Qb, and Qc. The light blocking member 220 is formed of a light blocking material to decrease light leakage.

The common electrode 270 is formed or disposed on an entire surface of the second substrate 210. A reference voltage is applied to the common electrode 270. The common electrode 270 includes a transparent conductive material. For example, the common electrode 270 may be made of indium tin oxide (ITO) or indium zinc oxide (IZO).

Although, according to an exemplary embodiment of present invention, the color filter 230 is positioned at the lower panel 100 and the light blocking member 220 is positioned at the upper panel 200, exemplary embodiments of the present invention are not limited thereto. The light blocking member 220 may be disposed in the lower panel 100 along with the color filter 230, both of the color filter 230 and the light blocking member 220 may be formed or disposed in the upper panel 200, and the light blocking member 220 may be positioned in the lower panel 100, and the color filter 230 may be positioned in the upper panel 200.

The liquid crystal display in accordance with the exemplary embodiment of the present invention may include an alignment layer formed or disposed on inner surfaces of the lower and upper panels 100 and 200 facing each other, and it may be a vertical alignment layer.

The liquid crystal display in accordance with the exemplary embodiment of the present invention may include two polarizers respectively formed or disposed on outer surfaces of the lower and upper panels 100 and 200 facing away from each other. Transmissive axes of the polarizers may be substantially perpendicular to each other, one of which is parallel with the gate line 121. The liquid crystal display in accordance with the exemplary embodiment of the present invention one polarizer disposed on the outer surface of either one of the lower panel 100 or upper panel and 200.

The liquid crystal layer 3 has negative dielectric anisotropy, and a long axis of liquid crystal molecules of the liquid crystal layer 3 are aligned to form substantially a right angle with respect to the surfaces of the two display panels 100 and 200 when no electric field is applied. Accordingly, when no electric field is applied, incident light may not pass through the polarizer and is blocked.

At least one of the liquid crystal layer 3 and the alignment layer may include a photo-reactive material, more specifically, a reactive mesogen.

In the liquid crystal display in accordance with the present exemplary embodiment, the first pixel electrode 190 and the second pixel electrode 191 of the lower panel 100 receive the data voltage, and the common electrode 270 of the upper panel 200 receives a reference voltage. Accordingly, an electric field is generated between the lower panel 100 and the upper panel 200 to control a direction of liquid crystal molecules of the liquid crystal layer 3. As a result, polarization of light passing through the liquid crystal layer 3 may be controlled depending on the direction of liquid crystal molecules as determined above.

The first subpixel electrode 190a and the third subpixel electrode 191a constitute the first liquid crystal capacitor Clca with the common electrode 270, to maintain the applied voltage after the switching element is turned off. The second subpixel electrode 190b and the fourth subpixel electrode 191b constitute the second liquid crystal capacitor Clcb with the common electrode 270, to maintain the applied voltage after the switching element is turned off.

When no data voltage is applied to the first pixel electrode 190 and the second pixel electrode 191, the direction of the liquid crystal molecules of the liquid crystal layer 3 may be substantially perpendicular to the first substrate 110 or the second substrate 210, or slightly tilted with respect to the first substrate 110 or the second substrate 210. That is, the liquid crystal molecules have a pretilt.

When the data voltage is applied to the first pixel electrode 190 and the second pixel electrode 191, the liquid crystal molecules of the liquid crystal layer 3 are tilted. In this case, the liquid crystal molecules positioned at different domains of the two subpixels PXa and PXb are tilted in different directions. Since the branch electrodes 194 of each subpixel extend in four longitudinal directions, the liquid crystal molecules are also tilted in four directions. As such, it is possible to increase viewing angle by tilting the directions of the liquid crystal molecules in various directions.

Further, since domains of the two subpixels PXa and PXb have different tilting directions of the liquid crystal molecules, the liquid crystal molecules may also have different pretilt directions in each domain of the two subpixels PXa and PXb. That is, the liquid crystal molecules disposed in different domains have different pretilt directions. The pretilt direction of each domain may be formed according to the tilting directions of the domain when an electric field is applied. The response speed of liquid crystal may be increased by configuring the liquid crystal molecules to have tilt directions according to each domain of the two subpixels PXa and PXb.

As described above, the branch electrodes 194 are formed in the second pixel electrode 191 to pretilt the direction of liquid crystal molecules according to each domain of the two subpixels PXa and PXb. Without the first pixel electrode 190, the electric field may not be evenly formed by the branch electrodes 194. According to the present exemplary embodiment, the electric field may be evenly formed by the first pixel electrode 190 having a planar shape.

Hereinafter, a manufacturing method of the display device in accordance with the exemplary embodiments of the present invention will be described with reference to FIGS. 6, 7, 8, 9, 10, and 11. The manufacturing method will further be described by referring back to FIGS. 1, 2, 3, 4, and 5.

Figure 8:
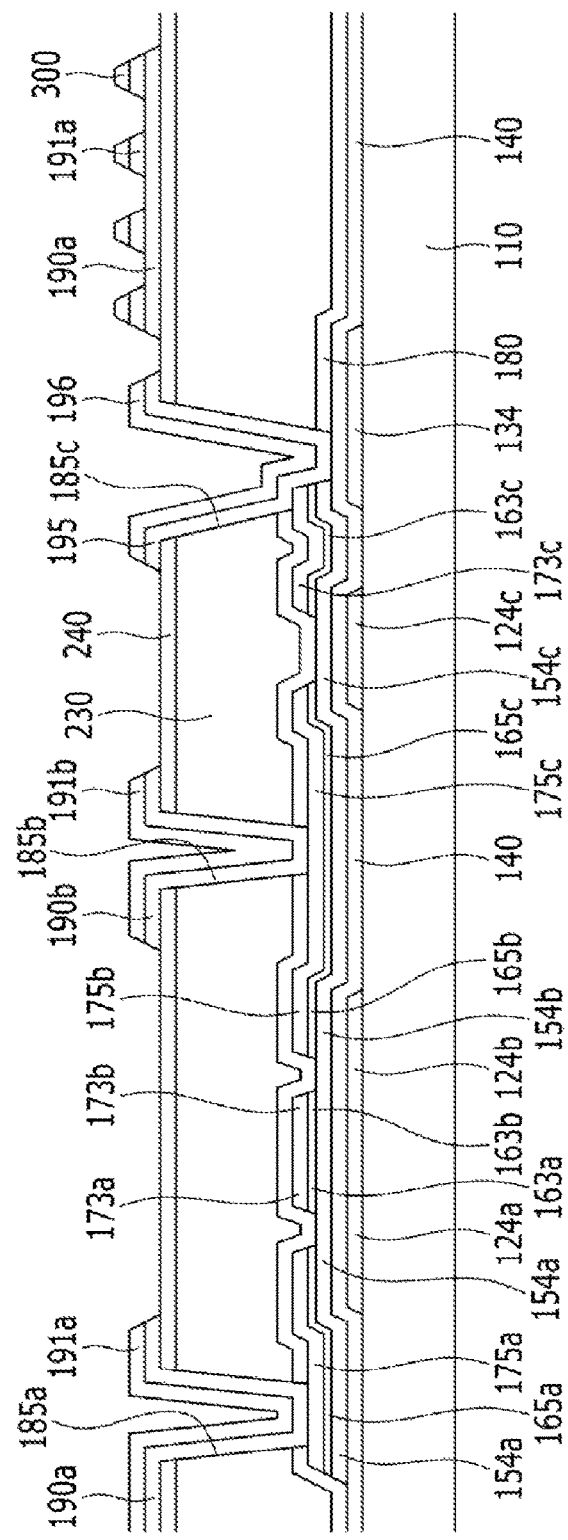
Figure 9:
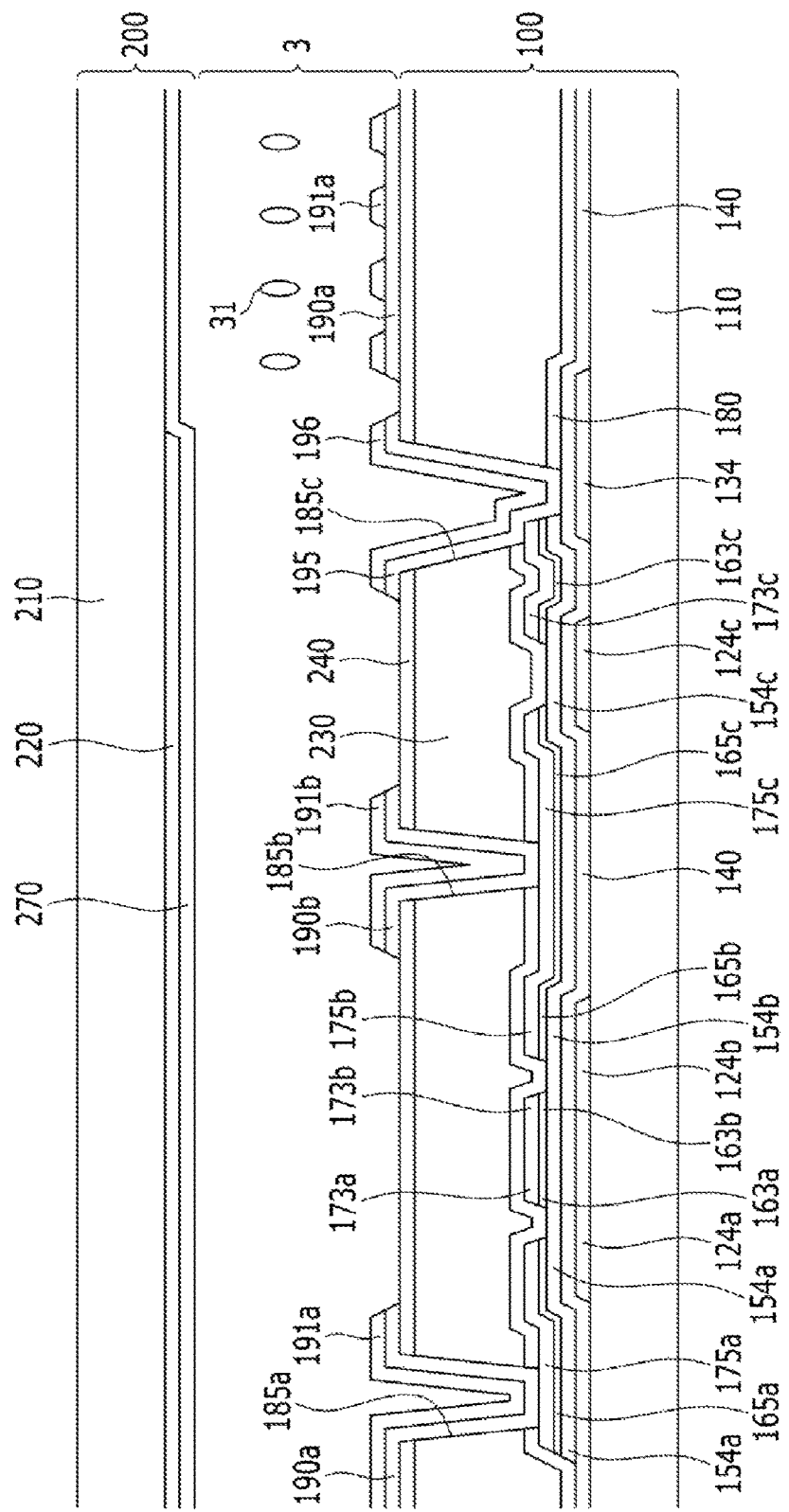
Figure 10:
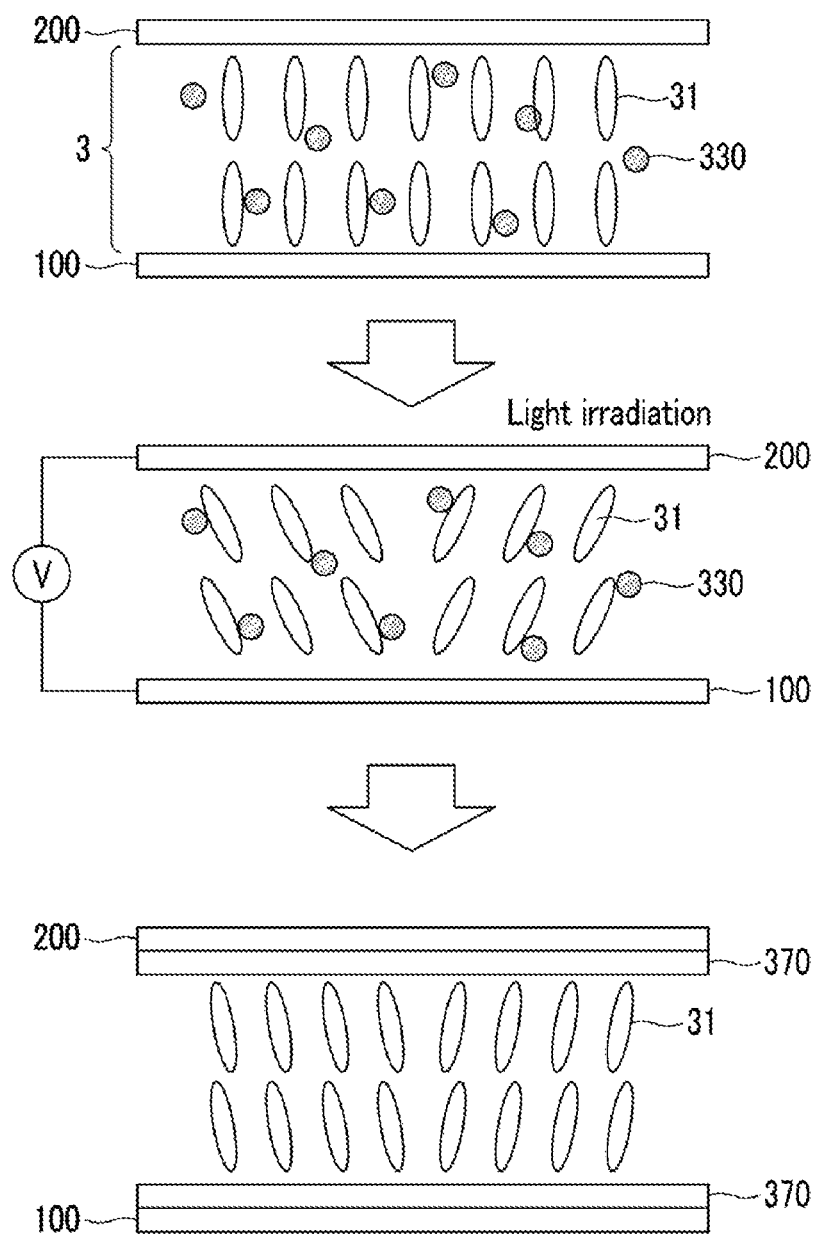

FIGS. 6, 7, 8, 9, 10, and 11 are cross-sectional views showing a manufacturing method of the liquid crystal display in accordance with exemplary embodiments of the present invention. Particularly, FIG. 10 shows a pretilting process to pretilt liquid crystal molecules using prepolymers that may be polymerized by radiating light such as ultraviolet rays.

Figure 6:
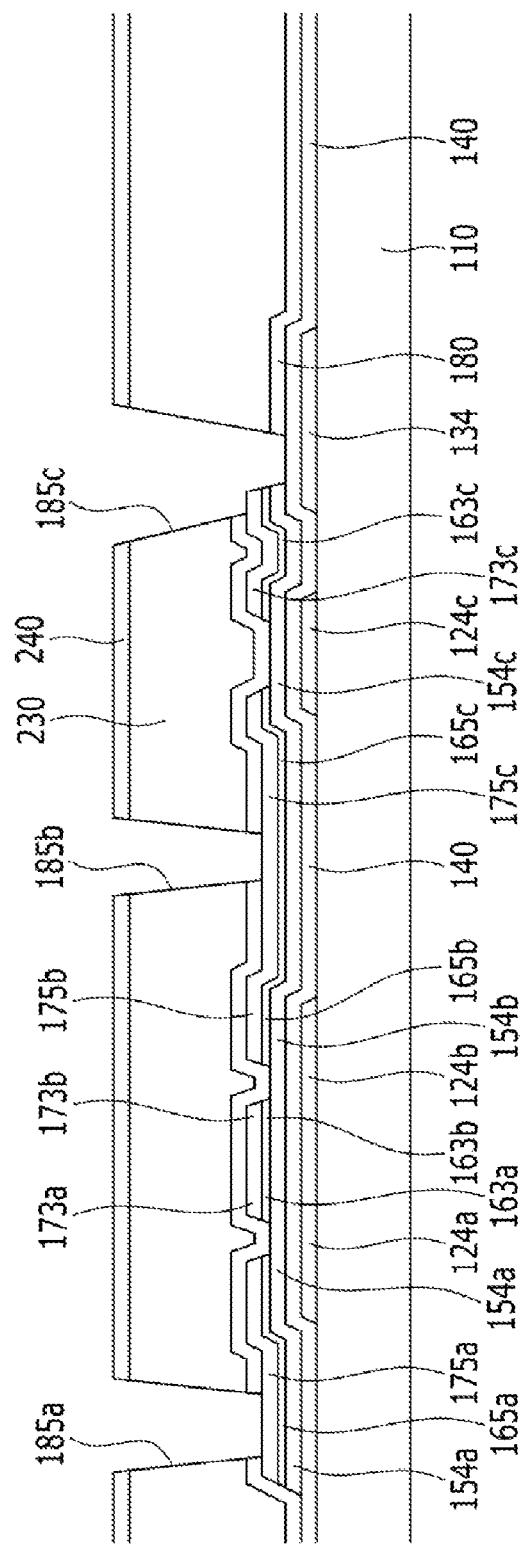
FIGS. 6, 7, 8, 9, 10, and 11 are cross-sectional views showing a manufacturing method of the liquid crystal display in accordance with exemplary embodiments of the present invention.

Referring to FIG. 6, the gate line 121, the data line 171, and the reference voltage line 131 are formed or disposed on the first substrate 110, and the first switching element Qa and the second switching element Qb are disposed electrically connected to the same gate line 121 and the same data line 171. Further, a third switching element Qc is disposed electrically connected to the gate line 121, the second switching element Qb, and a reference voltage line 131.

The passivation layer 180 is formed or disposed on the gate insulating layer 140, the data line 171, the first to third source electrodes 173a, 173b, and 173c, and the first to third drain electrodes 175a, 175b, and 175c. The color filter 230 is formed or disposed on the passivation layer 180, and the capping layer 240 is formed or disposed on the color filter 230.

The first contact hole 185a is formed to expose at least a part of the first switching element Qa by patterning the capping layer 240, the color filter 230, and the passivation layer 180. The second contact hole 185b is formed to expose at least a part of the second switching element Qb. The third contact hole 185c is formed to expose at least a part of the third switching element Qc and at least a part of the reference voltage line 131.

Specifically, the first contact hole 185a, the second contact hole 185b, and the third contact hole 185c respectively expose the first drain electrode 175a of the first switching element Qa, the second drain electrode 175b of the second switching element Qb, and the third source electrode 173c of the third switching element Qc.

Figure 7:
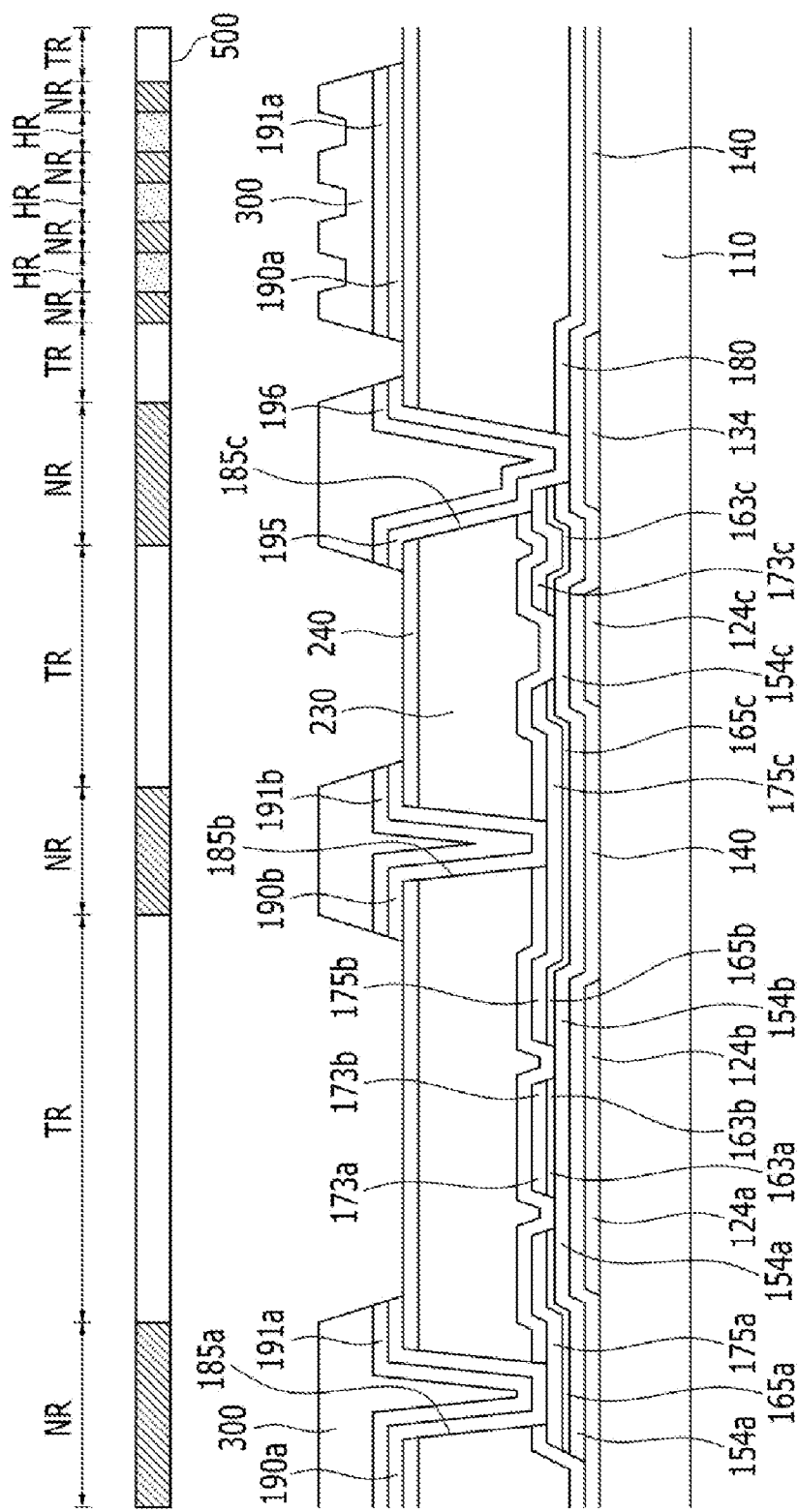

Referring to FIG. 7, the first pixel electrode 190 is formed or disposed on the capping layer 240 by using an oxide semiconductor material, and the second pixel electrode 191 is formed or disposed on the first pixel electrode 190 by using a transparent conductive material. The first bridge electrode 195 is formed or disposed on the capping layer 240 by using an oxide semiconductor material, and the second bridge electrode 196 is formed or disposed on the first bridge electrode 196.

First, the oxide semiconductor material and the transparent conductive material are successively deposited, and a photosensitive film 300 is formed by coating a photosensitive polymer material on the transparent conductive material. An exposure process is performed by positioning a mask 500 on the first substrate 110 and radiating light thereto.

The mask 500 may be formed of a slit mask, a halftone mask, and the like. The mask 500 includes a transmitting part TR which completely transmits light radiated to the mask 500, a non-transmitting part NR which does not transmit light, and a half transmitting part HR which partially transmits light.

Next, the photosensitive film 300 is developed. The photosensitive film 300 has at least two thicknesses. A portion of the photosensitive film 300 corresponding to the transmitting part TR of the mask 500 is removed. Portions of the photosensitive film 300 corresponding to the non-transmitting part NR and the half transmitting part HR of the mask 500 remain. The portion of the photosensitive film 300 corresponding to the non-transmitting part NR of the mask 500 has a thickness greater than that of the portion of the photosensitive film 300 corresponding to the half transmitting part HR of the mask 500. However, exemplary embodiments of the present invention are not limited thereto. The portions of the photosensitive film 300 removed may be different depending on a characteristic of the photosensitive film.

The transparent conductive material and the oxide semiconductor material are etched by using the photosensitive film 300 as a mask to form the first pixel electrode 190 and the second pixel electrode 191. The second pixel electrode 191 is formed or disposed immediately on the first pixel electrode 190. Further, the first bridge electrode 195 and the second bridge electrode 196 are formed. The second bridge electrode 196 is formed or disposed immediately on the first bridge electrode 195.

The first pixel electrode 190 and the first bridge electrode 195 are made of an oxide semiconductor material, and the second pixel electrode 191 and the second bridge electrode 196 are made of a transparent conductive material.

The first pixel electrode 190 includes the first subpixel electrode 190a and the second subpixel electrode 190b. The first subpixel electrode 190a and the second subpixel electrode 190b are formed electrically separated from each other. The first subpixel electrode 190a is formed in the first subpixel PXa, and the second subpixel electrode 190b is formed in the second subpixel PXb.

The first subpixel electrode 190a is electrically connected to the first drain electrode 175a through the first contact hole 185a, and the second subpixel electrode 190b is electrically connected to the second drain electrode 175b through the second contact hole 185b.

Each of the first subpixel electrode 190a and the second subpixel electrode 190b is formed to have a planar shape. Each of the first subpixel electrode 190a and the second subpixel electrode 190b is formed to have a substantially quadrangular shape.

The second pixel electrode 191 includes the third subpixel electrode 191a and the fourth subpixel electrode 191b. The third subpixel electrode 191a and the fourth subpixel electrode 191b are formed electrically separated from each other. The third subpixel electrode 191a is formed on the first subpixel electrode 190a in the first subpixel PXa. The fourth subpixel electrode 191b is formed on the second subpixel electrode 190b in the second subpixel PXb.

The third subpixel electrode 191a has a planar shape corresponding to that of the first subpixel electrode 190a, and the fourth subpixel electrode 191b has a planar shape corresponding to that of the second subpixel electrode 190b.

The first bridge electrode 195 electrically connects the reference voltage line 131 to the third switching element Qc through the third contact hole 185c. The second bridge electrode 196 has a planar shape corresponding to that of the first bridge electrode 195.

Referring to FIG. 8, the photosensitive film 300 is etched, and thus the portion of the photosensitive film 300 with a small thickness is removed. That is, the portion of the photosensitive film 300 corresponding to the half transmitting part HR of the mask 500 is removed. Accordingly, the thickness of the photosensitive film 300 corresponding to the non-transmitting part NR of the mask 500 may be decreased.

The second pixel electrode 191 is etched by using the remaining photosensitive film 300 as the mask. The planar shape of the second pixel electrode 191 is changed by etching only the second pixel electrode 191 without etching the first pixel electrode 190.

Each of the third subpixel electrode 191a and the fourth subpixel electrode 191b is formed to have an overall quadrangular planar shape. Each of the third subpixel electrode 191a and the fourth subpixel electrode 191b includes the horizontal stem 192 and the vertical stem 193 crossing the horizontal stem 193. Each of the third subpixel electrode 191a and the fourth subpixel electrode 191b is divided into four domains by the horizontal stem 192 and the vertical stem 193, and further includes the branch electrodes 194 positioned at each domain.

The branch electrodes 194 of the third subpixel electrode 191a and the fourth subpixel electrode 191b obliquely extend from either the horizontal stem 192 or the vertical stem 193 in an upper left direction, an upper right direction, a lower left direction, and a lower right direction.

Referring to FIG. 9, the light blocking member 220 and the common electrode 270 are formed or disposed on the second substrate 210.

Next, the first substrate 110 and the second substrate 210 are assembled to face each other, and the liquid crystal layer 3 is formed or disposed between the first substrate 110 and the second substrate 210 by injecting a liquid crystal material containing liquid crystal molecules. Referring to FIG. 10, prepolymers 330 such as a monomer may be injected along with the liquid crystal material, which may be hardened through polymerization radiating light such as ultraviolet rays. The prepolymers 330 may be a reactive mesogen which may be polymerized radiating light such as ultraviolet rays.

Although it has been described that the two substrates are assembled facing each other and the liquid crystal material is injected therein, exemplary embodiments of the present invention is not limited thereto. The first substrate 110 and the second substrate 210 may be assembled to face each other after the liquid crystal material is disposed on the first substrate 110 or the second substrate 210.

Different voltages are applied to the third subpixel electrode 191a and the fourth subpixel electrode 191b of the lower panel 100, and the common voltage is applied to the common electrode 270 of the upper panel 200, generating an electric field at the liquid crystal layer 3 disposed between the two display panels 100 and 200. In response to the electric field, the liquid crystal molecules 31 of the liquid crystal layer 3 are respectively pretilted in four directions parallel to the extending direction of the corresponding branch electrodes 194 of the third subpixel electrode 191a and the fourth subpixel electrode 191b from the fringe field caused by the third and fourth subpixel electrodes 191a and 191b and the common electrode 270. In this case, since different voltages are respectively applied to the third subpixel electrode 191a and the fourth subpixel electrode 191b, the liquid crystal molecules 31 corresponding to the third subpixel electrode 191a and the liquid crystal molecules 31 corresponding to the fourth subpixel electrode 191b may have different pretilt angles with respect to the first substrate 110.

The first pixel electrode 190 is made of an oxide semiconductor material and has a semiconductor characteristic, and thus no voltage is applied to the first pixel electrode 190 during the pretilting process. If the voltage is applied to the first pixel electrode 190 during the pretilting process, the liquid crystal molecules 31 may not be pretilted in various directions since the first pixel electrode 190 has the planar shape. According to exemplary embodiments of the present invention, the first pixel electrode 190 has a semiconductor characteristic during the pretilting process, and thus the electric field is generated only between the second pixel electrode 191 and the common electrode 270.

After generating the electric field to the liquid crystal layer 3, light such as ultraviolet rays may be radiated thereto, polymerizing the prepolymers 330 to form a polymer 370. The polymer 370 may be formed contacting the display panels 100 and 200. The polymer 370 may align direction of the liquid crystal molecules 310 to have the pretilt in the direction branch electrodes 194. Accordingly, the liquid crystal molecules 310 may be arranged with the pretilts in four different directions when no voltage is applied to the electrodes 191 and 270. As a result, the liquid crystal molecules 31 disposed at different domains may have different pretilt directions.

Figure 11:
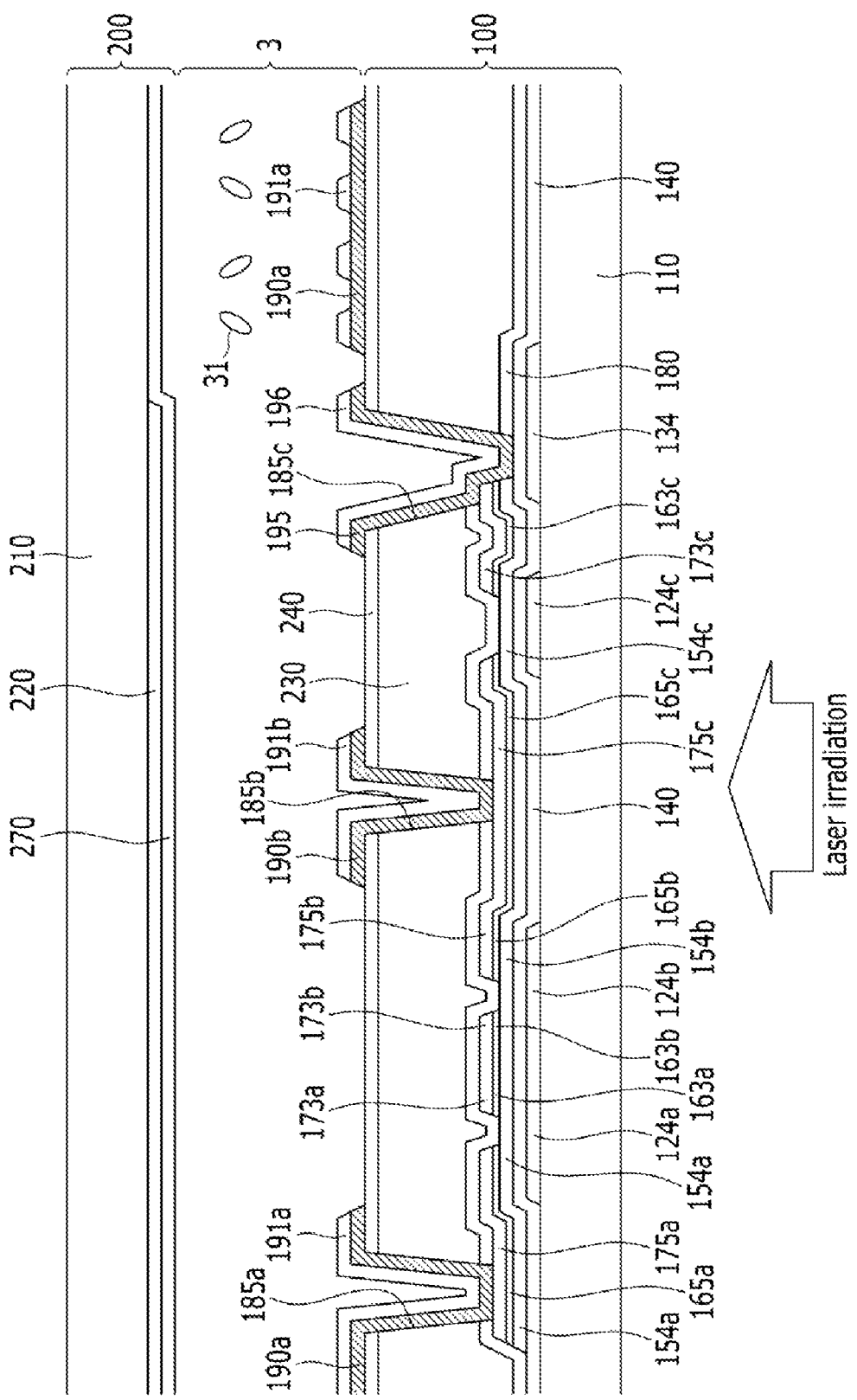

Referring to FIG. 11, bottom exposure is performed by radiating a laser from below the first substrate 110. The first pixel electrode 190 made of an oxide semiconductor material may have a conductive characteristic from the laser radiation. The method for making the first pixel electrode 190 to have conductive characteristic is not limited thereto, and various methods may be used.

As the first pixel electrode 190 is conductive, an electric field may be formed between the first pixel electrode 190 and the common electrode 270. If the voltage is applied to only the second pixel electrode 191, it is difficult to evenly form the electric field due to the branch electrodes 194. According to the exemplary embodiments of present invention, the electric field can be evenly formed from the planar shape of the first pixel electrode 190.

In accordance with exemplary embodiments of the present invention, during the pretilt process, the pretilt of the liquid crystal molecules can be generated by the branch electrodes 194 of the second pixel electrode 191 and the first pixel electrode 190 with semiconductor characteristic, thereby improving a response speed of the liquid crystal. After the pretilt process is completed, the first pixel electrode 190 may become conductive to evenly generate an electric field between the common electrode 270 and the first pixel electrode 190 having the planar shape, thereby obtaining an even electric field.

Next, a display device in accordance with an exemplary embodiment of the present invention will be described as follows with reference to FIG. 12 and FIG. 13.

Figure 12:
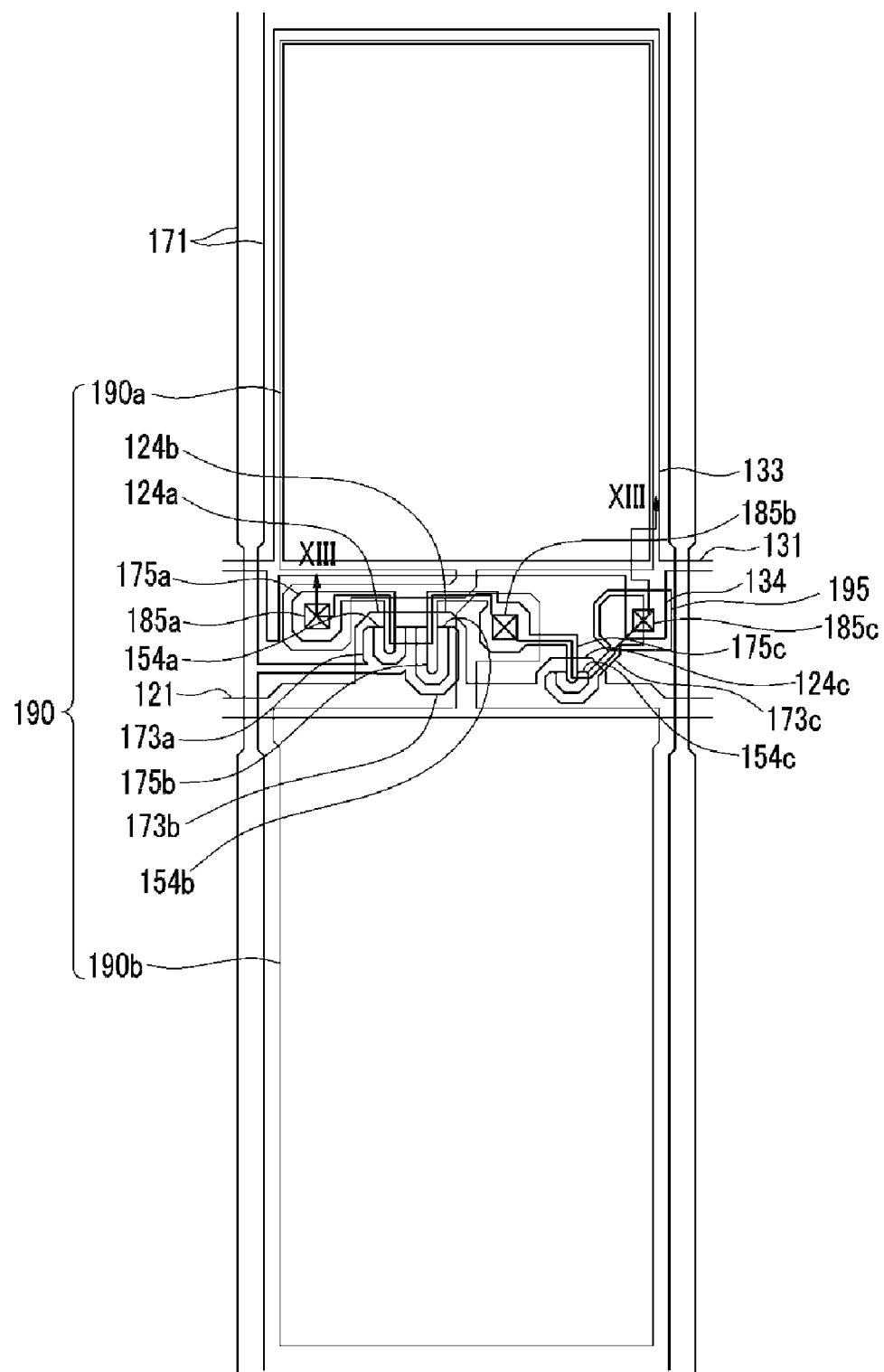
FIG. 12 is a top plan view showing the liquid crystal display in accordance with exemplary embodiments of the present invention.
Figure 13:
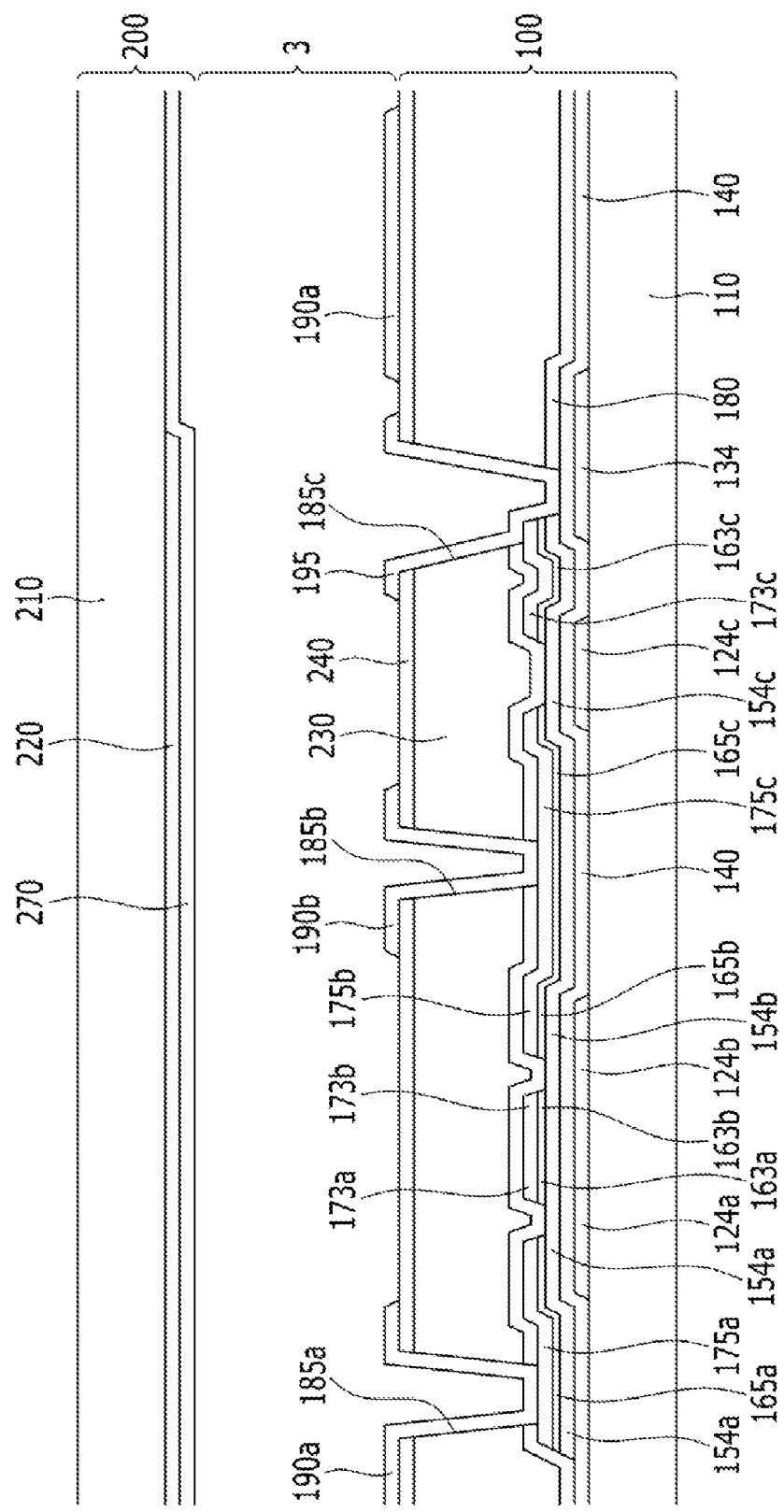
FIG. 13 is a cross-sectional view taken along with a line XIII-XIII of FIG. 12 in accordance with present exemplary embodiments of the present invention.

Since the display device in accordance with the exemplary embodiment of the present invention illustrated in FIG. 12 and FIG. 13 is substantially the same as the display device in accordance with exemplary embodiments of the present invention illustrated in FIGS. 1, 2, 3, 4, and 5, the description thereof will not be provided. The present exemplary embodiment is different from the above exemplary embodiment in that no second pixel electrode is formed, and hereinafter, will be described in more detail.

FIG. 12 is a top plan view showing the liquid crystal display in accordance with exemplary embodiments of the present invention, and FIG. 13 is a cross-sectional view taken along with a line XIII-XIII of FIG. 12 in accordance with exemplary embodiments of the present invention.

Referring to FIGS. 12 and 13, the liquid crystal display in accordance with the exemplary embodiment of the present invention includes the lower panel 100 and the upper panel 200 facing each other, and the liquid crystal layer 3 injected or disposed between the two panels 100 and 200.

In the lower panel 100, the first pixel electrode 190 is formed on the capping layer 240.

The first pixel electrode 190 includes an oxide semiconductor material. The first pixel electrode 190 is originally formed of a material having a semiconductor characteristic, but become conductive by laser radiation or the like. The first pixel electrode 190 may have a conductive characteristic when the liquid crystal display is completely manufactured in accordance with the exemplary embodiment.

The first pixel electrode 190 includes the first subpixel electrode 190a and the second subpixel electrode 190b. The first subpixel electrode 190a is connected to the first drain electrode 175a through the first contact hole 185a, and the second subpixel electrode 190b is connected to the second drain electrode 175b through the second contact hole 185b.

Each of the first subpixel electrode 190a and the second subpixel electrode 190b is formed to have a planar shape. Each of the first subpixel electrode 190a and the second subpixel electrode 190b is formed to have a substantially quadrangular shape.

The first bridge electrode 195 is further formed on the capping layer 240. The first bridge electrode 195 electrically connects the protrusion 134 to the third source electrode 173c through the third contact hole 185c.

According to present exemplary embodiment, no second pixel electrode is formed on the first pixel electrode, and no second bridge electrode is formed on the first bridge electrode. In accordance with the present exemplary embodiment, a pretilt may be generated in the liquid crystal molecules free of second pixel electrode including a plurality of branch electrodes. Each of the subpixels PXa and PXb includes four domains, and the liquid crystal molecules positioned at different domains may have different pretilt directions. Further, the electric field can be flatly formed by forming the first pixel electrode 190 to have a planar shape.

Hereinafter, a manufacturing method of the display device in accordance with the exemplary embodiment of the present invention will be described with reference to FIGS. 14, 15, 16, 17, and 18.

FIGS. 14, 15, 16, 17, and 18 are cross-sectional views showing a manufacturing method of the liquid crystal display in accordance with the present exemplary embodiment.

Referring back to FIG. 6, the gate line 121, the data line 171, and the like are formed or disposed on the first substrate 110, the passivation layer 180, the color filter 230, and the capping layer 240 are formed, and the first contact hole 185a, the second contact hole 185b, and the third contact hole 185c are formed.

Figure 14:
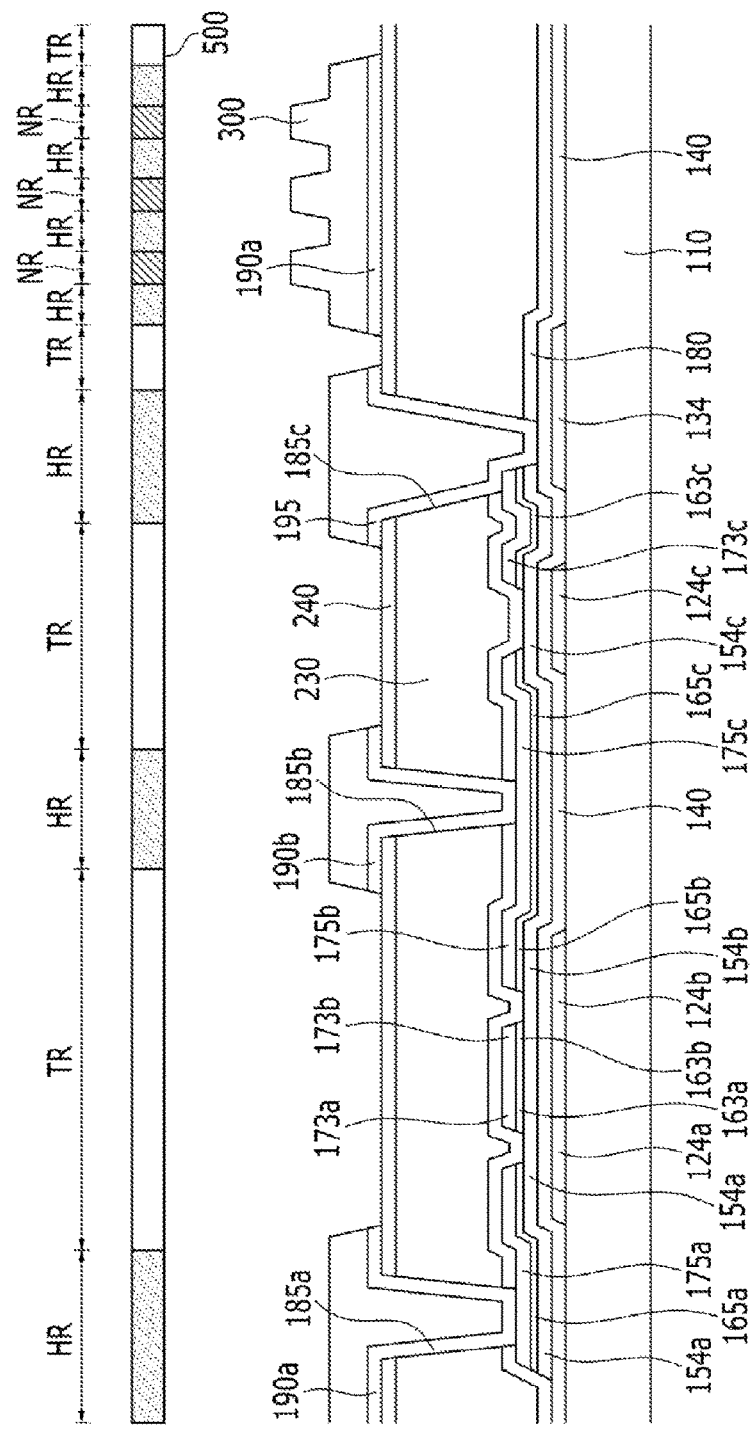
FIGS. 14, 15, 16, 17, and 18 are stepwise cross-sectional views showing a manufacturing method of the liquid crystal display in accordance with exemplary embodiments of the present invention.

Referring to FIG. 14, the first pixel electrode 190 and the first bridge electrode 195 are formed or disposed on the capping layer 240 by using an oxide semiconductor material.

First, the oxide semiconductor material is deposited, and a photosensitive film 300 is formed by disposing a layer of photosensitive polymer material on the transparent conductive material. An exposure process includes positioning a mask 500 on the first substrate 110 and radiating light thereto.

The mask 500 may be formed of a slit mask, a halftone mask, and the like. The mask 500 includes a transmitting part TR which completely transmits light radiated to the mask 500, a non-transmitting part NR which does not transmit light, and a half transmitting part HR which partially transmits light.

Next, the photosensitive film 300 is developed. The photosensitive film 300 has at least two thicknesses. A portion of the photosensitive film 300 corresponding to the transmitting part TR of the mask 500 is removed. Portions of the photosensitive film 300 corresponding to the non-transmitting part NR and the half transmitting part HR of the mask 500 remain. The portion of the photosensitive film 300 corresponding to the non-transmitting part NR of the mask 500 has a thickness greater than that of the portion of the photosensitive film 300 corresponding to the half transmitting part HR of the mask 500. However, exemplary embodiments of the present invention are not limited thereto. The portions of the photosensitive film 300 removed may be different depending on a characteristic of the photosensitive film.

The oxide semiconductor material is etched by using the photosensitive film 300 as a mask to form the first pixel electrode 190 and the first bridge electrode 195.

The first pixel electrode 190 includes the first subpixel electrode 190a and the second subpixel electrode 190b. The first subpixel electrode 190a and the second subpixel electrode 190b are formed electrically separated from each other. The first subpixel electrode 190a is formed in the first subpixel PXa, and the second subpixel electrode 190b is formed in the second subpixel PXb.

The first subpixel electrode 190a is electrically connected to the first drain electrode 175a through the first contact hole 185a, and the second subpixel electrode 190b is electrically connected to the second drain electrode 175b through the second contact hole 185b.

Each of the first subpixel electrode 190a and the second subpixel electrode 190b is formed to have a planar shape.

Each of the first subpixel electrode 190a and the second subpixel electrode 190b is formed to have a substantially quadrangular shape.

The first bridge electrode 195 electrically connects the reference voltage line 131 and the third switching element Qc through the third contact hole 185c.

Figure 15:
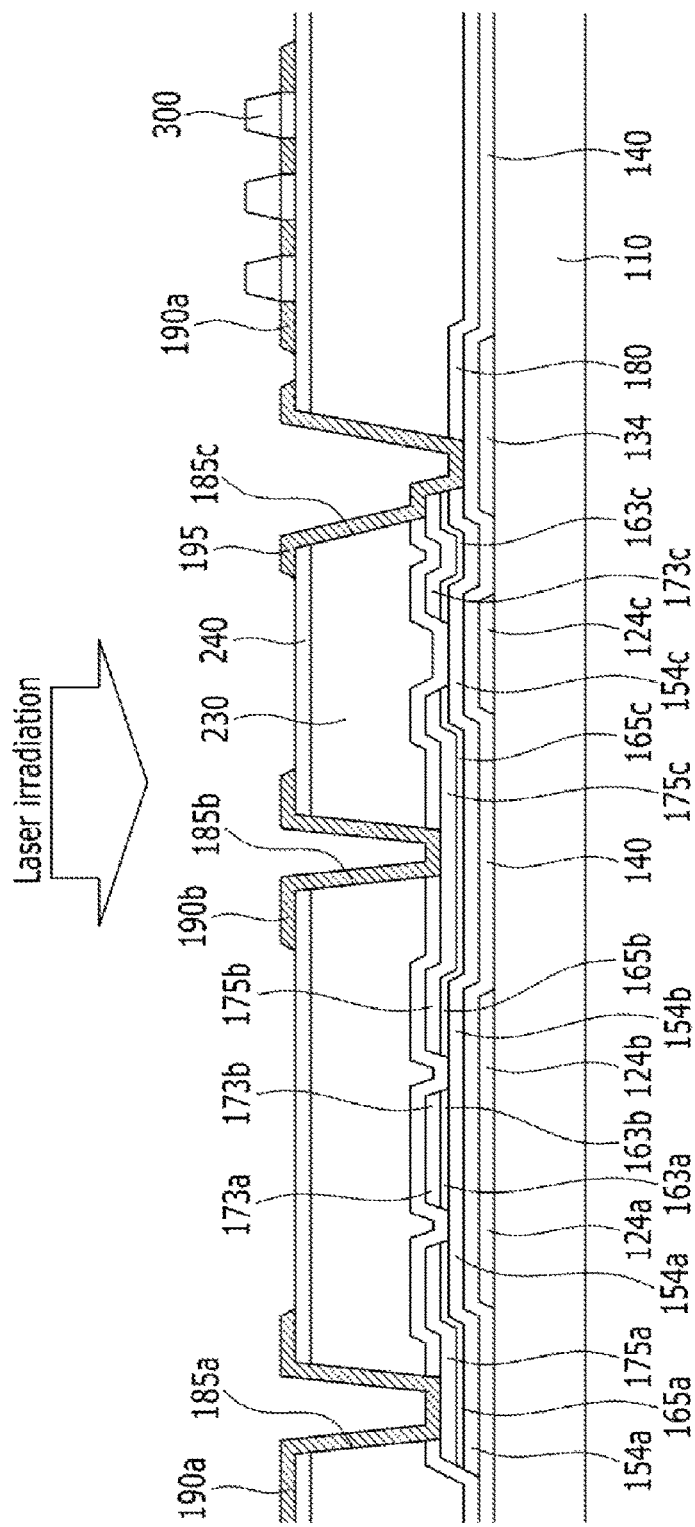

Referring to FIG. 15, the photosensitive film 300 is etched, and thus the portion of the photosensitive film 300 with a small thickness is removed. That is, the portion of the photosensitive film 300 corresponding to the half transmitting part HR of the mask 500 is removed. Accordingly, the thickness of the photosensitive film 300 corresponding to the non-transmitting part NR of the mask 500 may be decreased.

Next, top exposure process is performed by radiating a laser from above the first substrate 110. The first pixel electrode 190 made of an oxide semiconductor material can become conductive by the laser radiation. In this case, the photosensitive film 300 is remaining at a portion of the first pixel electrode 190. As a result, the portion of the first pixel electrode 190 covered by the photosensitive film 300 may remain to have the semiconductor characteristic, and the other portion of the first pixel electrode 190 not covered by the photosensitive film 300 (i.e., a shaped portion, which is referred to as a first region) may become conductive.

The first region of the photosensitive film 300 having the conductive characteristic may have the same planar shape as that of the second pixel electrode 191 illustrated in FIG. 5. Accordingly, the first region may include branch regions, and the branch regions are located at different domains extending in different directions.

Figure 16:
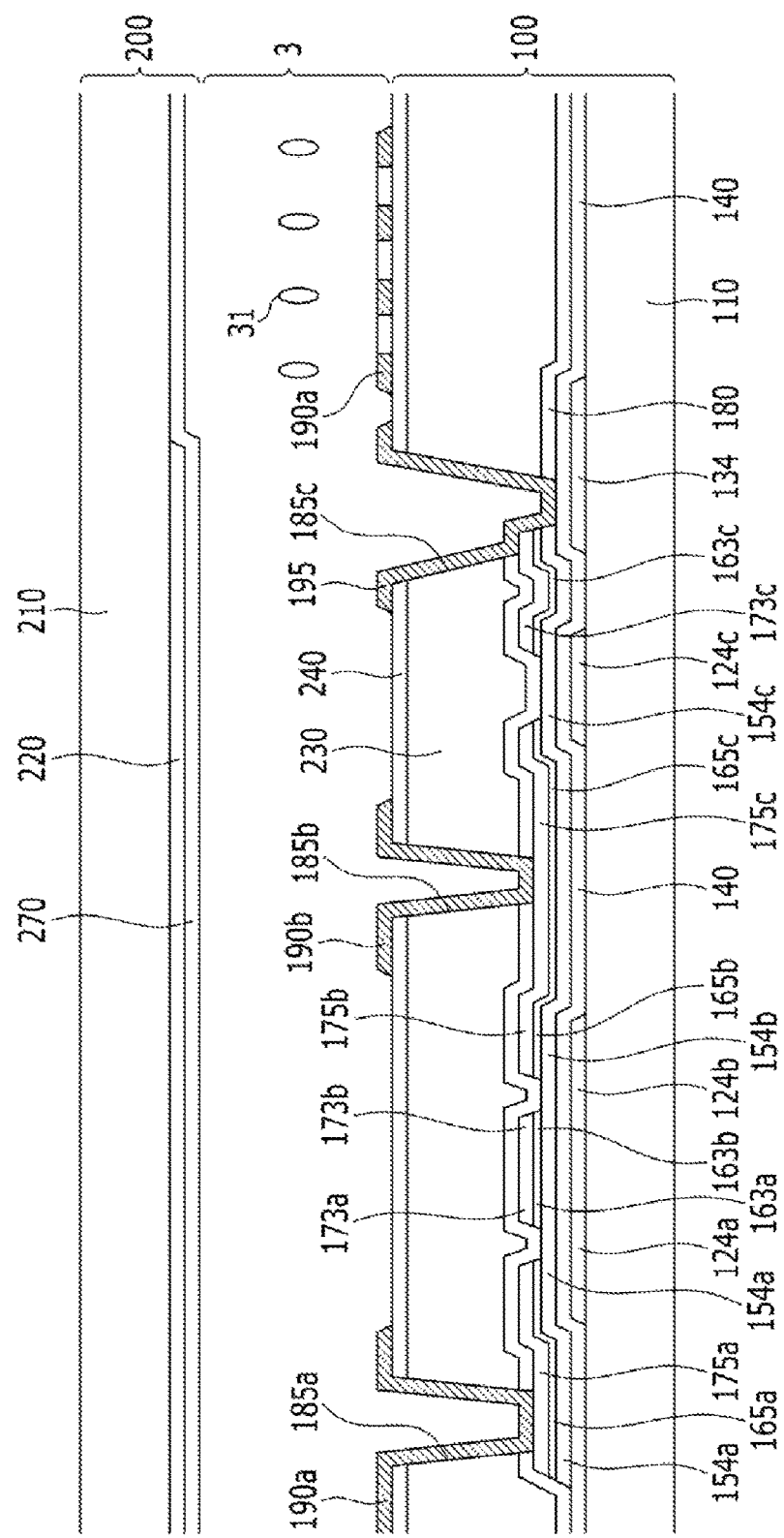

Referring to FIG. 16, the light blocking member 220 and the common electrode 270 are formed on the second substrate 210. Next, the first substrate 110 and the second substrate 210 are assembled to face each other, and the liquid crystal layer 3 is formed or disposed between the first substrate 110 and the second substrate 210 by injecting a liquid crystal material containing liquid crystal molecules therein. In this case, prepolymers 330 such as a monomer may be injected along with the liquid crystal material, which may be hardened through polymerization by radiating light such as ultraviolet rays. The liquid crystal molecules 31 are formed substantially perpendicular to the first substrate 110 or second substrate 210.

Figure 17:
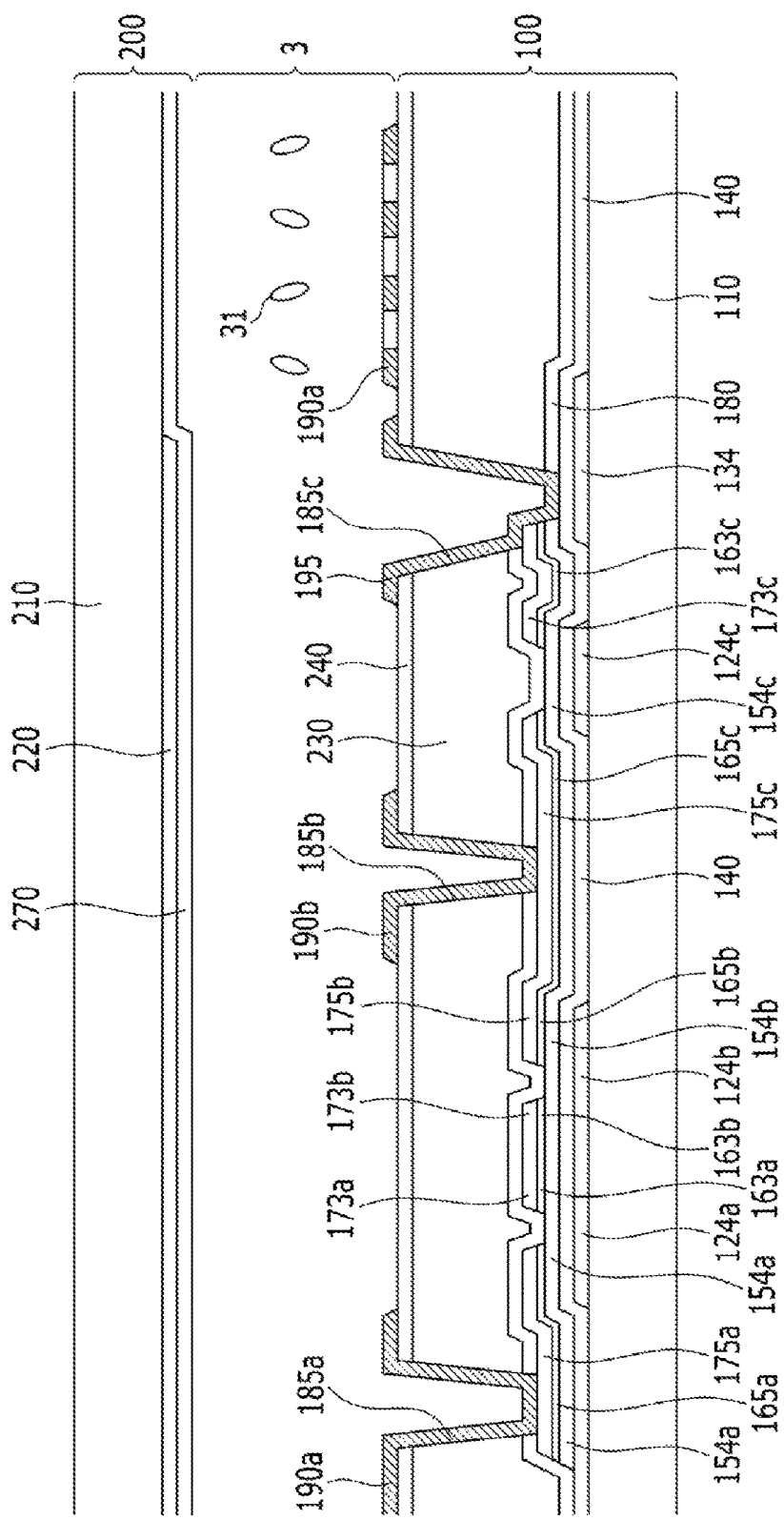

Referring to FIG. 17, different voltages are applied to the first subpixel electrode 190a and the second subpixel electrode 190b of the lower panel 100, and the common voltage is applied to the common electrode 270 of the upper panel 200, generating an electric field at the liquid crystal layer 3 disposed between the two display panels 100 and 200. In response to the electric field, the liquid crystal molecules 31 of the liquid crystal layer 3 are respectively pretilted in different directions according to the fringe field caused by the common electrode 270 and the portion of the first subpixel electrode 190a that are conductive. Further, the liquid crystal molecules 31 positioned at different domains may be pretilted in different directions by the fringe field between the common electrode 270 and the portion of the second subpixel electrode 190b that are conductive. In this case, since the different voltages are respectively applied to the first subpixel electrode 190a and the second subpixel electrode 190b, the liquid crystal molecules 31 corresponding to the first subpixel electrode 190a and the liquid crystal molecules 31 corresponding to the second subpixel electrode 190b may have different pretilt angles with respect to the first substrate 110.

The region of the first pixel electrode 190 other than the first region has semiconductor characteristic, and no voltage is applied thereto. In the present exemplary embodiment, the electric field is generated only between the common electrode 270 and the first region of the first pixel electrode 190 having the conductive characteristic.

When the electric field is generated at the liquid crystal layer 3, light such as ultraviolet rays may be radiated thereto, aligning the direction of the liquid crystal molecules 31 to have a pretilt. Accordingly, the liquid crystal molecules 310 may be arranged with the pretilts in four different directions when no voltage is applied to the electrodes 191 and 270. As a result, the liquid crystal molecules 31 disposed at different domains may have different pretilt directions.

Figure 18:
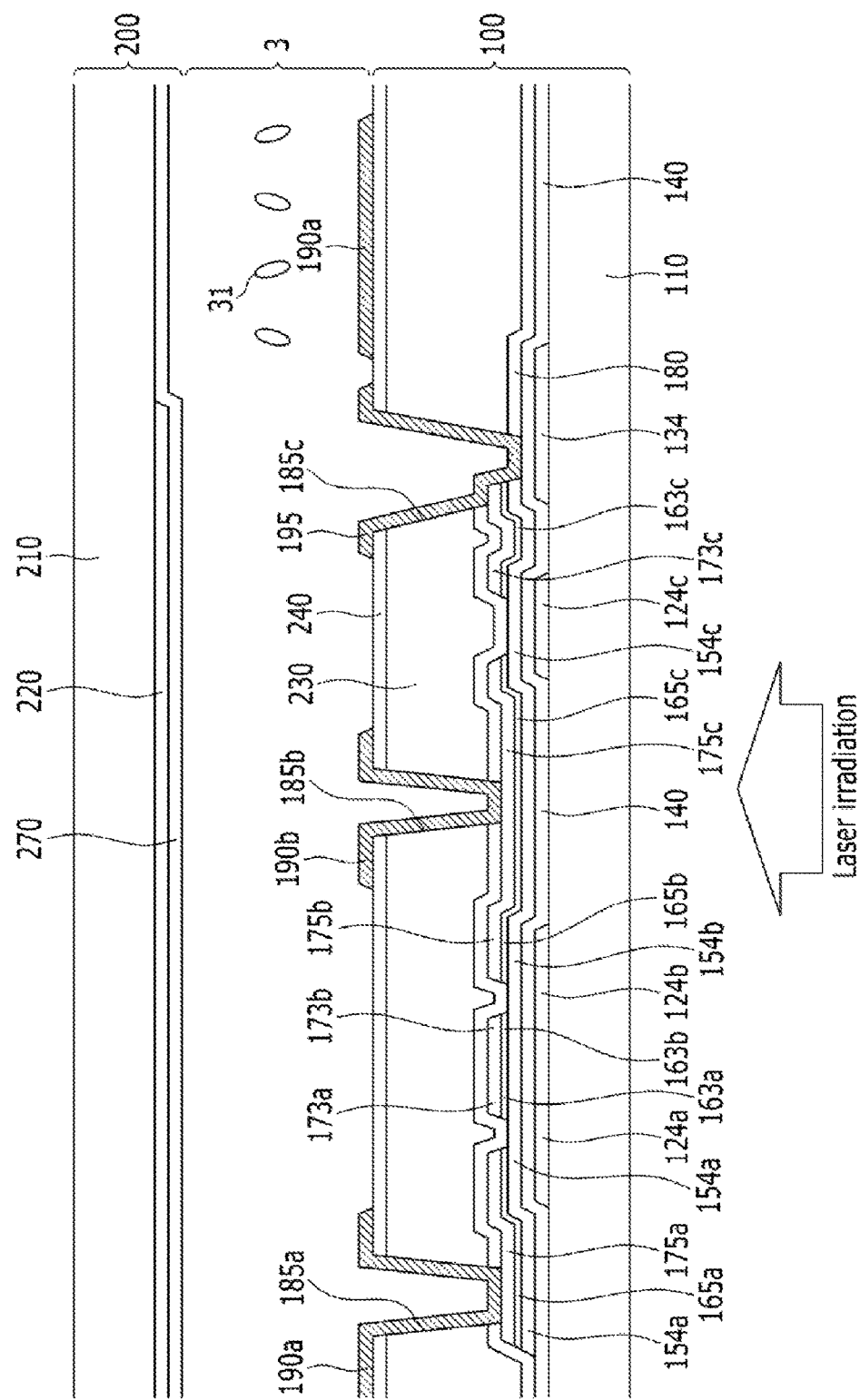

Referring to FIG. 18, bottom exposure is performed by irradiating a laser from below the first substrate 110. As a laser is radiated to an entire part of the first pixel electrode 190, the entire part of the first pixel electrode 190 can become conductive. As the entire part of the first pixel electrode 190 is made conductive, an electric field may be generated between the common electrode 270 and the entire part of the first pixel electrode 190. The electric field can be evenly formed from the planar shape of the first pixel electrode 190.

In accordance with the exemplary embodiments of the present invention, during the pretilt process, the pretilt of the liquid crystal molecules can be generated by the branch electrodes 194 of the second pixel electrode 191 and the first region of the first pixel electrode 190 having the conductive, thereby improving a response speed of liquid crystal. After the pretilt process is completed, the entire part of the first pixel electrode 190 may become conductive to evenly generate an electric field between the common electrode 270 and the first pixel electrode 190 having the planar shape, thereby obtaining an even electric field.

While this invention has been described in connection with what is presently considered to be practical exemplary embodiments, it will be apparent to those skilled in the art that various modifications and variations can be made in the present invention without departing from the spirit or scope of the invention. Thus, it is to be understood that the invention is not limited to the disclosed embodiments, but, on the contrary, is intended to cover various modifications and equivalent arrangements provided they come within the spirit and scope of the appended claims and their equivalents.

What is claimed is:

1. A liquid crystal display, comprising:
    a first substrate comprising a first pixel electrode and a second pixel electrode, the first pixel electrode having a planar shape and the second pixel electrode comprising a plurality of branch electrodes;
    a second substrate disposed facing the first substrate, comprising a common electrode disposed on the second substrate;
    a liquid crystal layer comprising a plurality of liquid crystal molecules disposed between the first substrate and the second substrate; and
    a plurality of pixels disposed between the first substrate and the second substrate, each of the plurality of pixels comprising a plurality of domains,
    wherein liquid crystal molecules of the liquid crystal layer disposed in different domains have different pretilt directions, and
    wherein the second pixel electrode is disposed directly on the first pixel electrode.

2. The liquid crystal display of claim 1, wherein the first pixel electrode comprises an oxide semiconductor material.

3. The liquid crystal display of claim 2, wherein the first pixel electrode comprises indium gallium zinc oxide (IGZO).

4. The liquid crystal display of claim 1, wherein the second pixel electrode comprises a transparent conductive material.

5. The liquid crystal display of claim 4, wherein the second pixel electrode comprises indium tin oxide (ITO) or indium zinc oxide (IZO).

6. The liquid crystal display of claim 1, wherein:
    the second pixel electrode further comprises a horizontal stem and a vertical stem which cross each other, wherein each of the plurality of branch electrodes obliquely extends from either the horizontal stem or the vertical stem; and
    each of the plurality of branch electrodes disposed in different domains extends in different directions.

7. The liquid crystal display of claim 1, wherein:
    the first pixel electrode comprises a first subpixel electrode and a second subpixel electrode disposed separated from each other;
    the second pixel electrode comprises a third subpixel electrode and a fourth subpixel electrode disposed separated from each other; and
    the third subpixel electrode is disposed on the first subpixel electrode, and the fourth subpixel electrode is disposed on the second subpixel electrode.

8. The liquid crystal display of claim 7, wherein the first substrate further comprises:
    a gate line and a data line;
    a reference voltage line configured to transmit a reference voltage;
    a first switching element and a second switching element electrically connected to the gate line and the data line; and
    a third switching element electrically connected to the gate line, the second switching element, and the reference voltage line,
    wherein the first subpixel electrode and the third subpixel electrode are electrically connected to the first switching element, and
    wherein the second subpixel electrode and the fourth subpixel electrode are electrically connected to the second switching element.

* * * * *